Sept. 8, 1936.   W. A. HARDCASTLE ET AL   2,053,870
TRAIN CONTROL SYSTEM
Filed Aug. 11, 1928   9 Sheets-Sheet 3
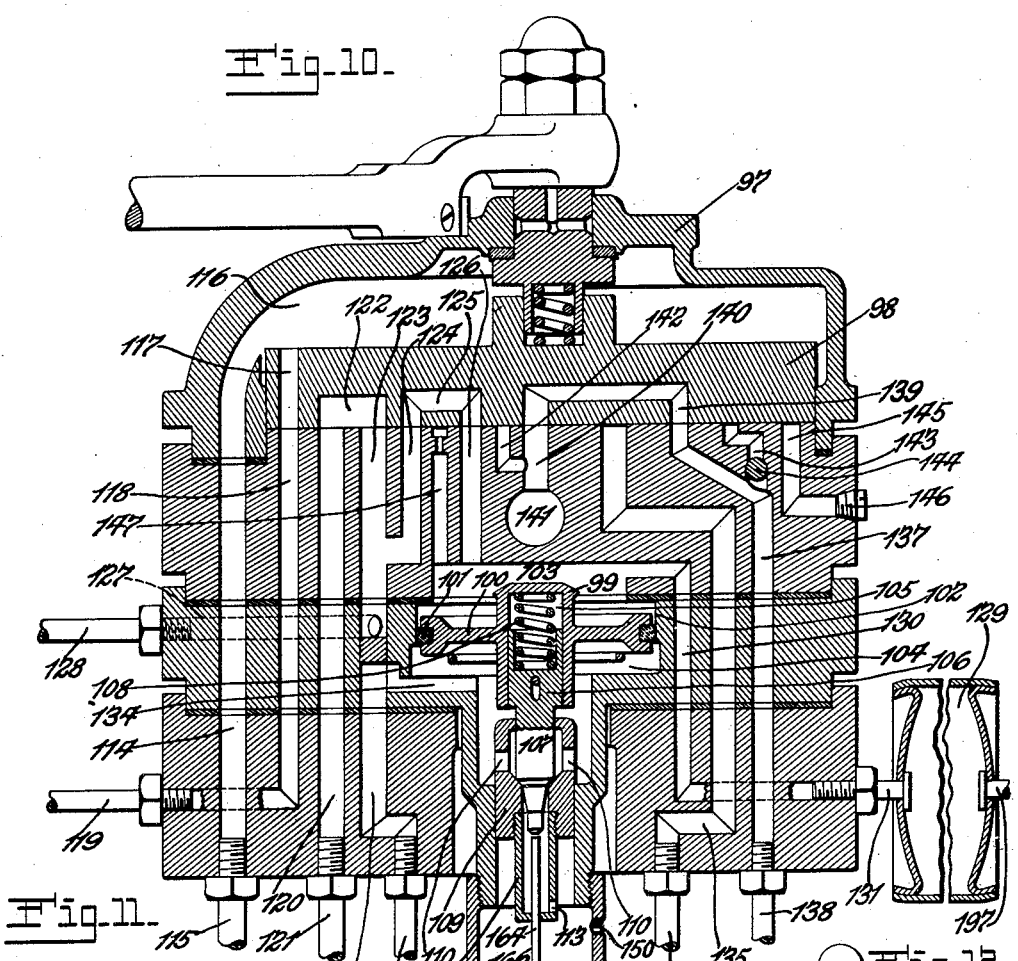
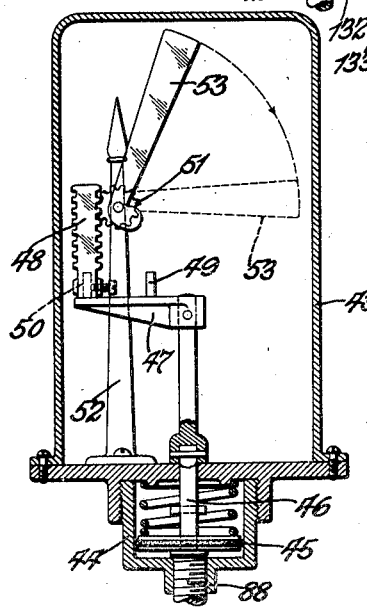
Inventors.
William A. Hardcastle,
Joe C. Minter,
by Rippey & Kingsland.
Their Attorneys.

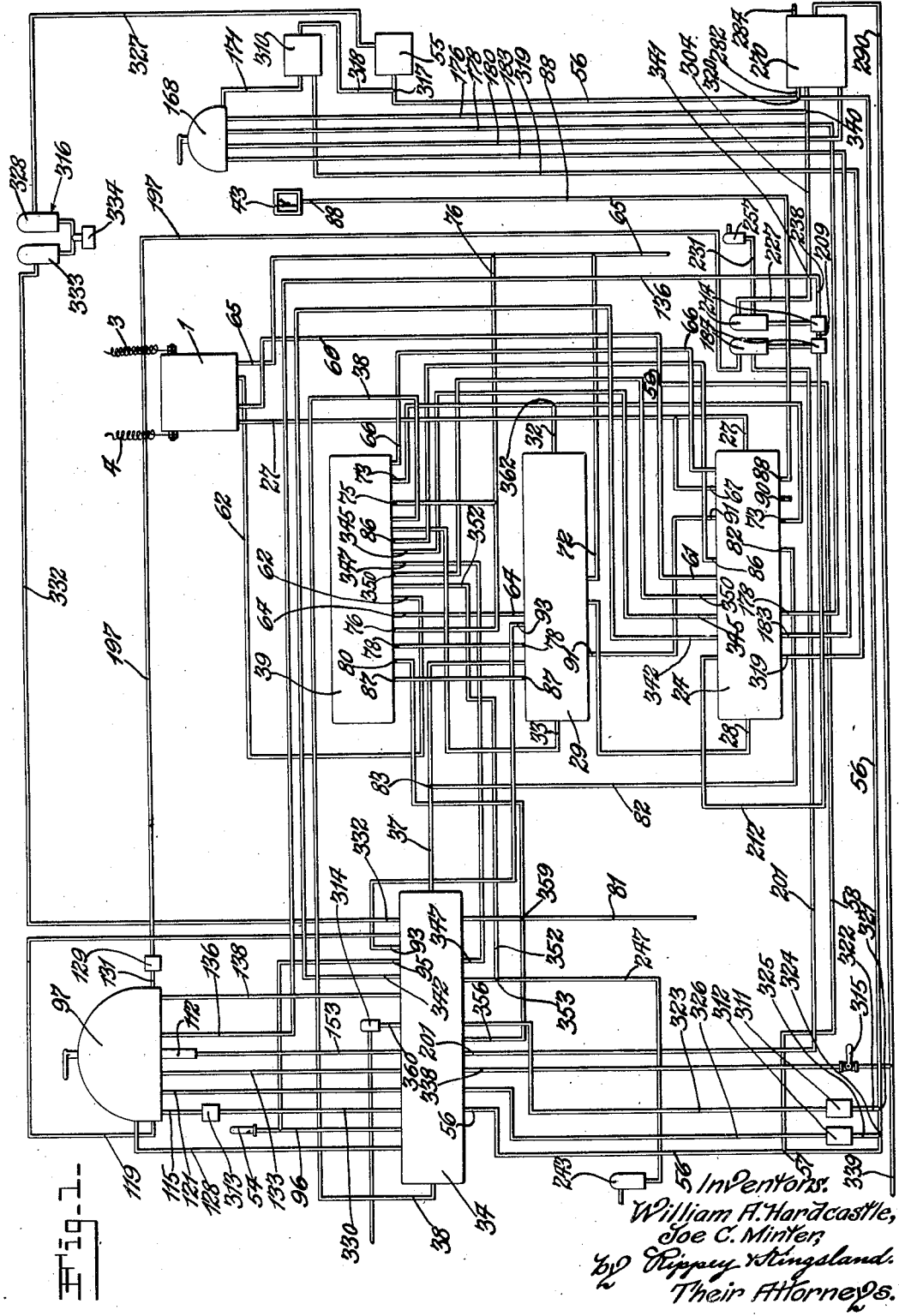

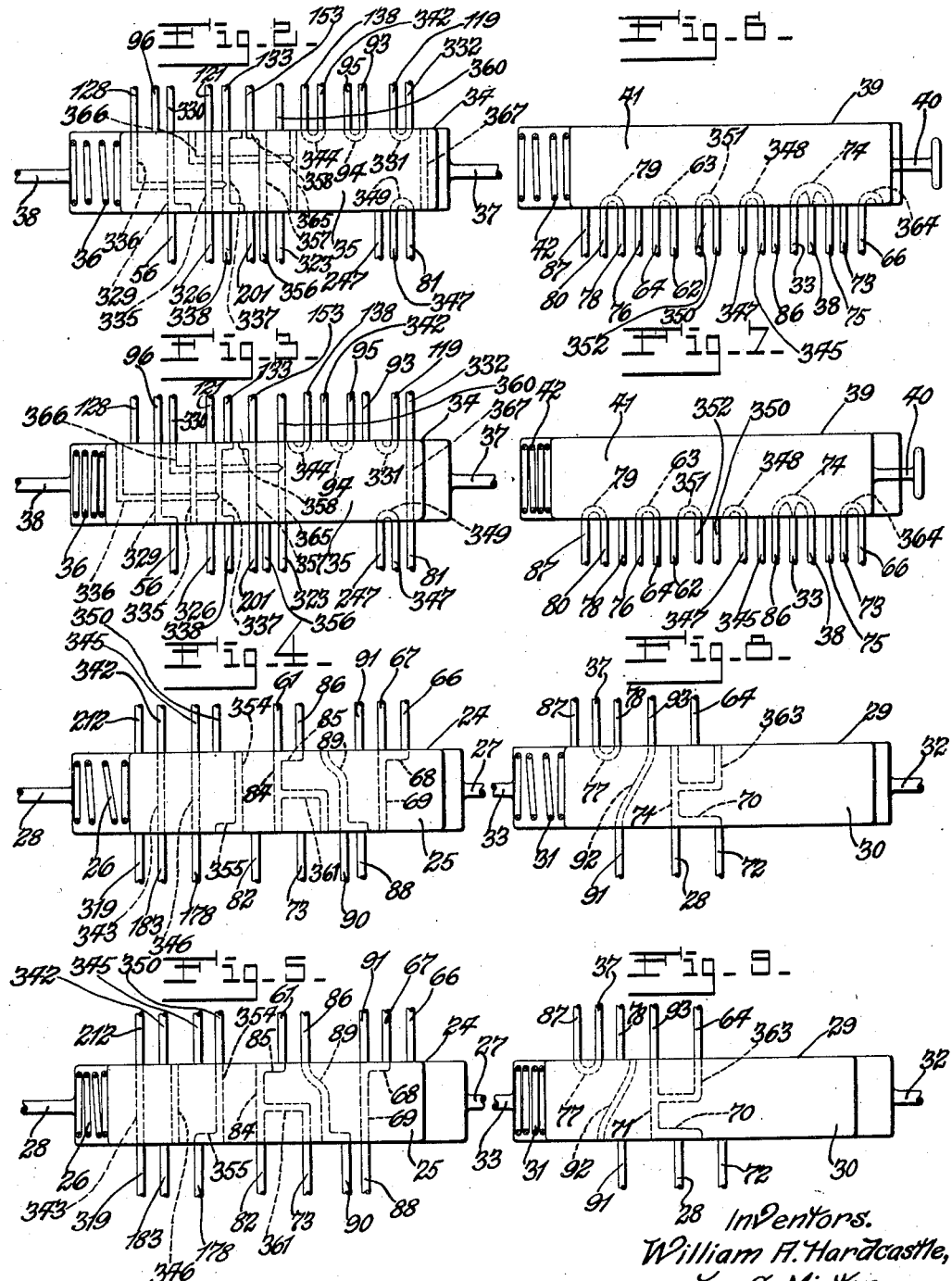

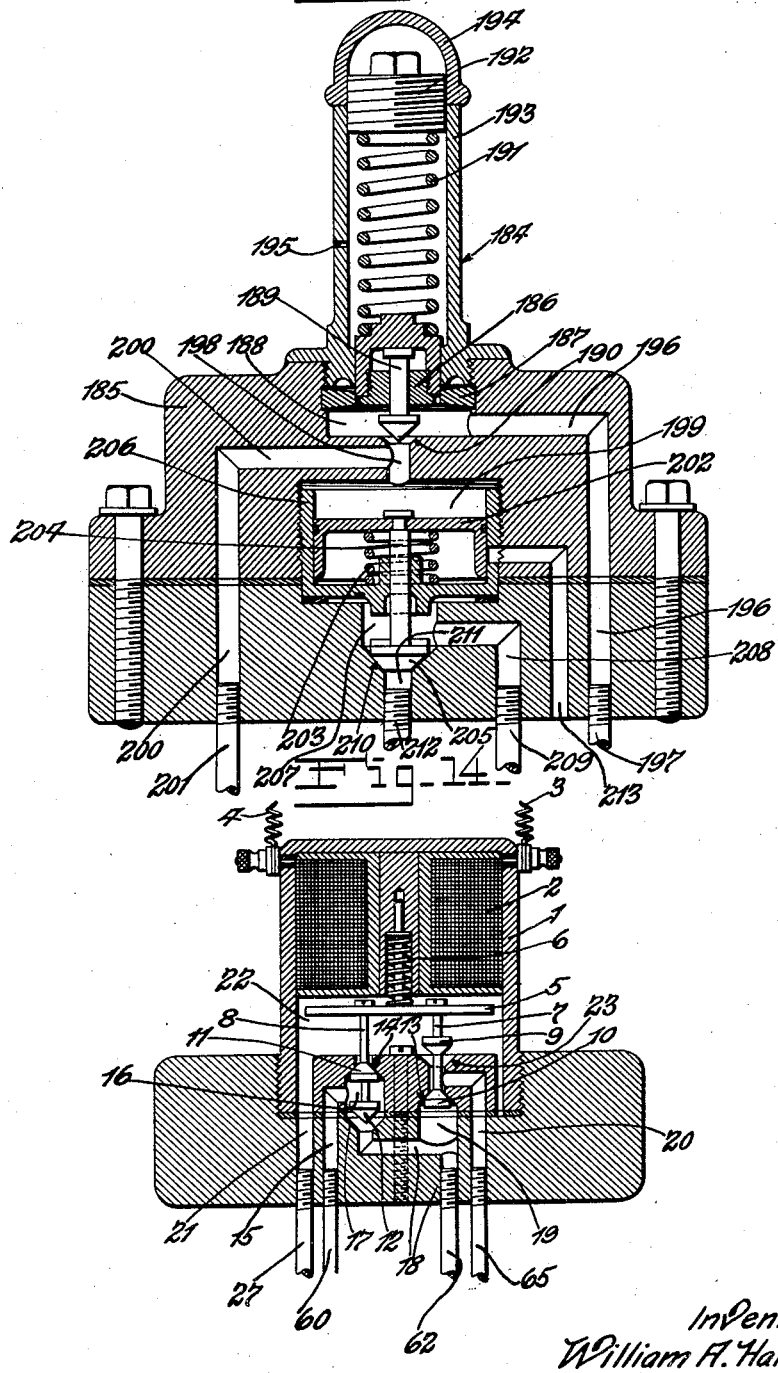

Inventors.
William A. Hardcastle,
Joe C. Minter,
Their Attorneys.

Sept. 8, 1936.  W. A. HARDCASTLE ET AL  2,053,870
TRAIN CONTROL SYSTEM
Filed Aug. 11, 1928   9 Sheets-Sheet 6
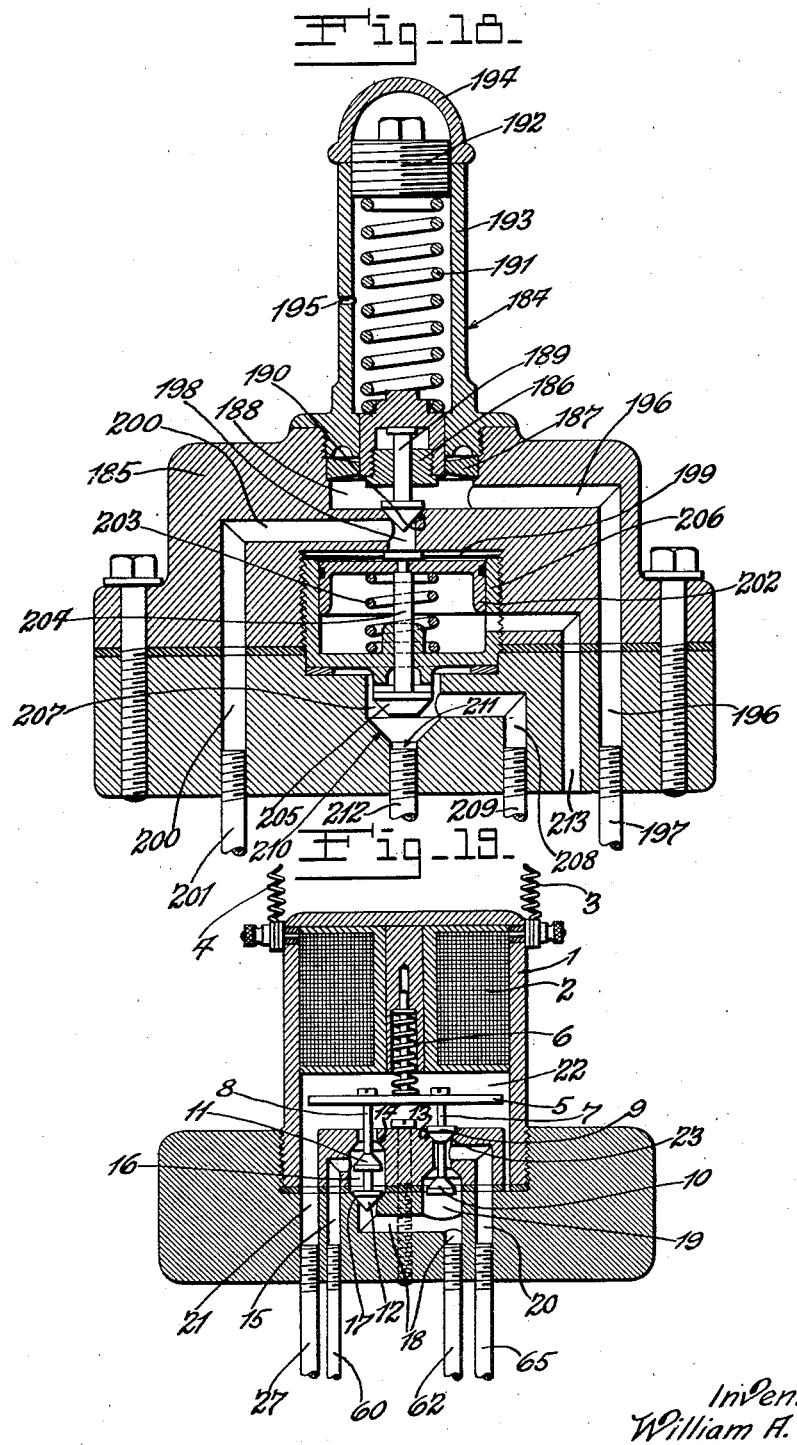
Inventors.
William A. Hardcastle,
Joe C. Minter,
Rippey Kingsland,
Their Attorneys.

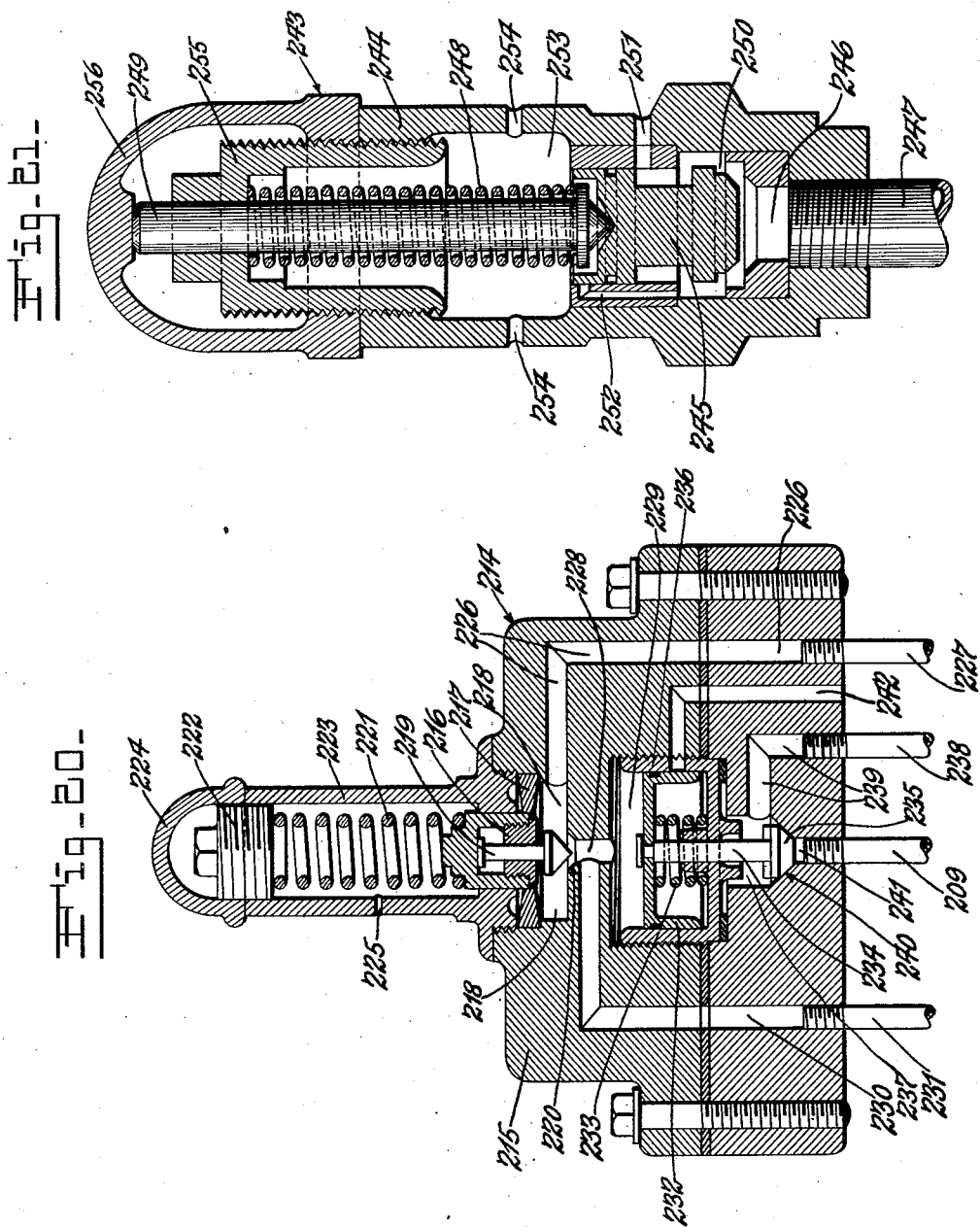

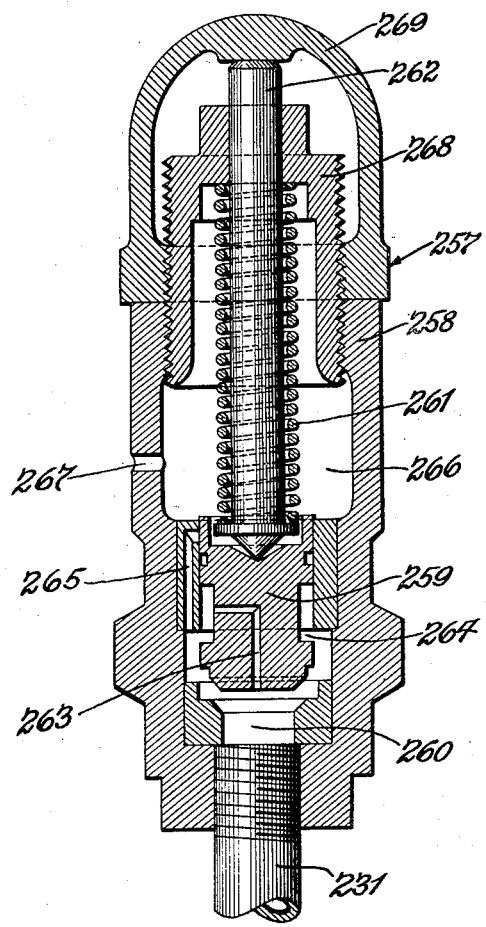

Sept. 8, 1936.    W. A. HARDCASTLE ET AL    2,053,870
TRAIN CONTROL SYSTEM
Filed Aug. 11, 1928    9 Sheets-Sheet 9
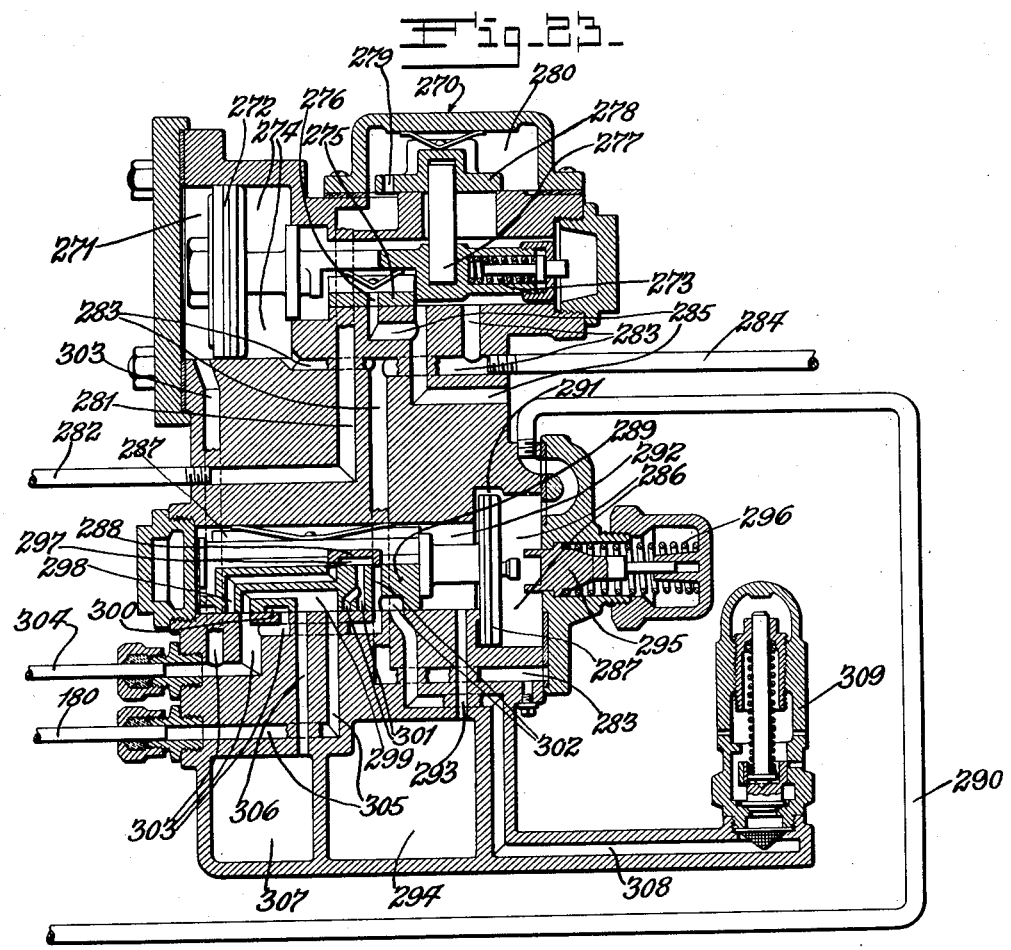
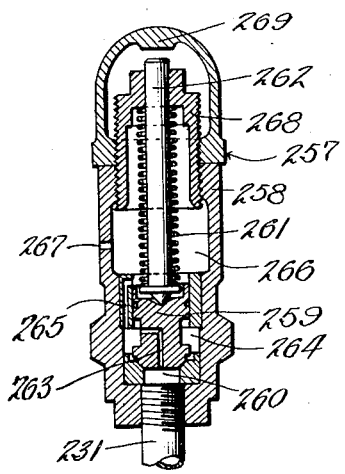
Inventors.
William A. Hardcastle,
Joe C. Minter,
by Rippey & Kingsland
Their Attorneys.

Patented Sept. 8, 1936

2,053,870

UNITED STATES PATENT OFFICE 2,053,870

TRAIN CONTROL SYSTEM

William A. Hardcastle and Joe C. Minter,
St. Louis, Mo.

Application August 11, 1928, Serial No. 299,028

13 Claims. (Cl. 303—18)

This invention relates to improvements in train control systems, and consists in the novel construction and arrangement of parts, devices and connections hereinafter more fully disclosed.

An object of the invention is to provide an air-operated system under the influence of a device operable incident to a safe or unsafe condition of the track to apply and release the locomotive and train brakes in which, during an unsafe condition of the track, the manual control of the braking system by the operator is so modified that the normal operation of the locomotive or train is prevented until the track condition has been cleared and the control system manually reset by the operator.

Additional advantages of the construction will be fully apparent from the following description, taken in connection with the accompanying drawings in which Fig. 1 is a diagrammatic view of the complete system.

Fig. 2 is a diagrammatic view of a valve constituting one of the controls for the system, said valve being shown in normal position and identified as the lap valve.

Fig. 3 is a view of the same valve in application position.

Fig. 4 is a diagrammatic view of another of the valves of the control system shown in normal position and identified as the main control valve.

Fig. 5 is a view of the same valve in application position.

Fig. 6 is a diagrammatic view of another of the valves of the control system in normal position and identified as the restoring valve.

Fig. 7 is a view of the same valve in application position.

Fig. 8 is a diagrammatic view of another of the valves of the control system in normal position and identified as the exhaust control valve.

Fig. 9 is a view of the same valve in application position.

Fig. 10 is a diagrammatic view of an automatic brake valve shown in normal or running position with a pleniminary exhaust valve connected therewith in normal or closed position.

Fig. 11 is a vertical section through an air-operated indicator associated with the control system and shown in normal position.

Fig. 12 is a diagrammatic view of an independent brake valve shown in normal or running position.

Fig. 13 is a vertical section through an equalizing reservoir governor shown in normal or open position.

Fig. 14 is a vertical section through a main electrical control valve of the control system shown in normal position.

Fig. 17 is a vertical section through a locomotive brake governor control valve in normal or open position.

Fig. 18 is a vertical section through the equalizing reservoir governor in application or closed position.

Fig. 19 is a vertical section through the main electrical control valve of the control system in application position.

Fig. 20 is a vertical section through the locomotive brake governor in application or open position.

Fig. 21 is a vertical section through the restricted exhaust safety valve in application or open position.

Fig. 22 is a vertical section through the locomotive brake governor control valve in application or closed position.

Fig. 23 is a diagrammatic view of the distributing valve in normal or running position.

Figure 16:
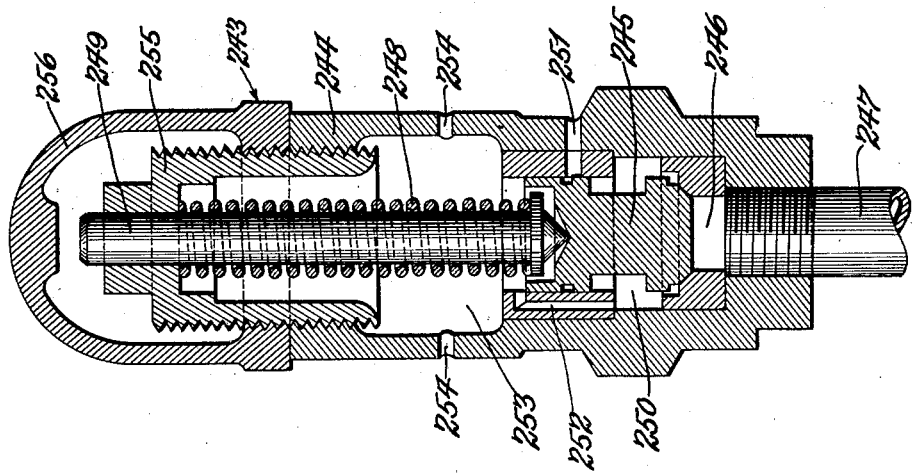
Fig. 16 is a vertical section through a restricted exhaust safety valve shown in normal or closed position.

It will be understood broadly that the braking system is operated by the application and release of air pressure. This is accomplished through a system of pressure control actuated through a main electrical control valve that, in turn, is under the influence of the track condition. For convenience in description and clarity of disclosure it will be convenient to separate in a broad aspect the pressure control system and its controlling elements from the braking system per se; and these elements, for the sake of brevity, will be referred to as the control system.

In the embodiment of the invention illustrated in the drawings there is a main electrical control valve 1 (shown in normal position in Fig. 14, and in application position in Fig. 19), which valve comprises an electrical field 2, said field being connected with a circuit comprising a lead 3 and 4 forming a circuit with electrical energizing means that function during clear track conditions to energize the field 2. This circuit actuates an armature 5 which is held in a raised or normal position, as illustrated in Fig. 14, against the tendency of a spring 6. The armature has connected therewith a pair of valve stems 7 and 8 which carry, respectively, a double valve body 9 and 10, and 11 and 12. The valve 10 seats at 13, and the valve 11 seats at 14.

In the body of the valve there is a passage 15 that connects into a chamber 16. A seat 17 at the lower end of the chamber 16 constitutes a port from the chamber 16 to a passage 18, which passage 18 is connected with a chamber 19. The seat 13 constitutes a port from the chamber 19 to a passage 20. There is a passage 21 that connects into a chamber 22, and the seat 14 constitutes a port from the chamber 22 to the chamber 16. A seat 23 constitutes a port from the chamber 22 to the passage 20.

The control system also includes a valve 24, identified as a main control valve, which valve is shown in detail in normal position in Fig. 4 and in application position in Fig. 5.

This valve comprises a cylinder in which there is a movable element 25 which functions as a piston. The member 25 is designed as a double action piston having pressure chambers at each end thereof. In one of the pressure chambers there is an expansion spring 26, the function of which is to control the valve in the normal position to which it is actuated by pressure admitted to the chamber in which the spring is seated. It is to be understood that the adjustment of the tension of the spring 26 is such that it does not operate as a power element, but operates merely as a detent for holding the piston in normal position. A conduit 27 connects into the application chamber of the valve. A conduit 28 connects into the opposite chamber or normal chamber of the valve. The functioning of the valve 24 will be more fully described hereinafter.

Another element of the control system is an exhaust control valve 29, shown in detail in normal position in Fig. 8 and in application position in Fig. 9. The valve 29 is similar in construction to the valve 24 and functions and operates in substantially the same manner. It includes a double piston 30 operating in a cylinder in which there is a spring 31. A conduit 32 connects into the application chamber thereof; and a conduit 33 connects into the opposite chamber or normal chamber. The functioning of the valve 29 likewise will be more fully described hereinafter.

Another element of the control system is a valve 34, shown in detail in normal position in Fig. 2 and in application position in Fig. 3. The valve 34 likewise has a double action piston 35 that is mounted in a cylinder or housing in which there is a spring 36 at one end of the piston. The spring 36 operates in a manner similar to the springs 26 and 31 in the valves 24 and 29, respectively. There is a conduit 37 that connects into the application chamber thereof. A conduit 38 connects into the opposite end of the valve cylinder or normal chamber. In making general reference to the valve 34 it will be referred to as the lap valve. Its function will be more fully described hereinafter.

Another element of the control system is the valve 39 which will be referred to as the restoring valve, and which is shown in normal position in Fig. 6 and in application position in Fig. 7. The valve 39 is of the same general construction as the valves 24, 29 and 34, with the exception that it is provided with a plunger 40 at the end of a double acting piston 41 and with a spring 42 at the opposite end of the piston. The spring 42 operates as a power element to force and hold the valve in normal position. The valve is manually operated in the direction in opposition to the spring by pressure applied to the plunger 40.

There is associated with the control system an air-operated indicator 43, shown in detail in Fig. 11. This indicator comprises a cylinder 44 in which there is a spring-operated piston 45. The piston is normally held in the downward adjustment by the spring, as illustrated in Fig. 11. A piston rod 46 is connected with the piston 45 which, for the purpose of assembly, may be made in two sections. The upper end of the piston rod 46 carries a bracket 47 to which is attached a rack bar 48. The bracket 47 has a pair of pins 49 and 50 on its upper face and the rack bar has a socket at its lower end so that it may be positioned and set on either of the pins 49 or 50. This permits the actuation of the semaphore arm in either direction, as desired.

The rack bar 48 meshes with a pinion 51 carried by a support 52, said support having connected therewith a semaphore arm 53. When the piston 45 is in its downward adjustment in the cylinder the semaphore arm is in the position shown in Fig. 11 and serves to indicate a condition of the control system. It should be understood that the air-operated indicator does not affect the other elements of the control system, its purpose being merely to provide a visible means for indicating to the operator a position of the main electrical control valve 1 and the position of the main control valve 24 under certain operative conditions to be described more fully hereinafter.

There is also associated with the control system a whistle 54 (Fig. 1) which is of known construction and is incorporated in the system as a means for indicating the position of the control system audibly when air pressure is admitted thereto. The whistle 54 does not affect the other elements of the control system. Its function in the operation of the system will be made apparent hereinafter.

When the control system is in normal position there are certain parts of the system supplied with pressure, others are open to atmosphere, and others in which there is no pressure and no exhaust. These conditions may be considered in the nature of an advance setting of the system to insure that it will assume the application position when operated to that end, and it will first be assumed in this description that this advance setting or normal position exists and the condition of the system thus considered will now be described.

Air pressure for the operation of the control system originates at the main reservoir 55. The pressure in the main reservoir 55 is induced and maintained by a pump in the usual manner. Under ordinary conditions the main reservoir carries approximately ninety pounds gage pressure which is a satisfactory pressure for usual operations. A conduit 56 is connected into the main reservoir and connects at 57 with a conduit 58 that branches at 59 into a conduit 60, said conduit 60 connecting into the main electrical control valve. Therefore, it is apparent that the conduit 60 is at all times supplied with the main reservoir pressure and irrespective of the position of the control system. There is another conduit 61 that branches at 59 and leads to the main control valve 24 thereby supplying said valve with main reservoir pressure at all times and irrespective of the position of the control system.

The field 2 of the valve 1 is normally energized by a circuit closed over the leads 3 and 4 through the engine control relay or other means during and throughout a clear condition of the track. When the field 2 is energized the valve 1 is in its normal position in which the armature 5 is held in raised position against the tendency of the spring 6. Therefore, main reservoir pressure is delivered by the conduit 60 to the passage 15 through the chamber 16 and the port 17 to the passage 18, thence into a conduit 62 through a passage 63 of the valve 39 and to a conduit 64 where it is shut off by the movable member or piston 30 of the valve 29.

In this advance setting or normal condition of the system the application chamber of the valve 24 is exhausted to atmosphere through the conduit 27, the passage 21, the chamber 22 and the port 23 to the passage 20 of the valve 1; and thence to a multiple exhaust conduit 65, which conduit is open to atmosphere.

A conduit 66 connects the main control valve 24 with the restoring valve 39 and is closed by the piston 41 in said valve 39. At its opposite end the conduit 66 is connected with a conduit 67 through a groove 68 of a passage 69. Since the conduit 67 connects with the conduit 27 and the conduit 27 is open to atmosphere, as above described, it is evident that there will be no pressure in the conduits 66 or 67. The normal chamber of the valve 24 in this setting of the system is exhausted to atmosphere through the conduit 28 connecting thereinto, which conduit connects with a groove 70 of a passage 71 in the piston 30 of the valve 29; thence to a conduit 72 to the multiple exhaust conduit 65.

The application chamber of the valve 29 is closed. The conduit 32 leads from said application chamber to a conduit 73 which is closed at one of its outlet ends by the piston 41 of the valve 39 and at its other outlet end by the piston 25 of the valve 24. The normal chamber of the valve 29 is connected to atmosphere through the conduit 33, a passage 74 in the piston 41 of the valve 39, a conduit 75 and a conduit 76, said conduit 76 connecting into the multiple exhaust conduit 65.

The application chamber of the valve 34 is connected to atmosphere through the conduit 37 connecting into said chamber, a passage 77 of the piston 30 of the valve 29, a conduit 78, a restricted passage 79 in the piston 41 of the valve 39 and a conduit 80 which connects into a multiple exhaust conduit 81.

A conduit 82 which branches at 83 from the conduit 37 is closed by the piston 25 of the valve 24. Since the conduit 37 is exhausted to atmosphere, as above described, it follows that there will be no pressure in the conduit 82 in this setting of the system.

The normal chamber of the valve 34 in this setting of the system exhausts to atmosphere through the conduit 38 connected thereto which leads through a restricted branch opening of the passage 74 of the piston 41 of the valve 39; thence to the conduit 75 which connects with the conduit 76, one end of said conduit 76 connecting into the multiple exhaust conduit 65.

The conduit 61 which is supplied with main reservoir pressure during all operations of the system connects with a passage 84 in the piston 25 of the valve 24. The passage 84 has a groove 85 which connects with a conduit 83 leading to the valve 39. Therefore, main reservoir pressure delivered by the conduit 61 is conducted to the valve 39 by the conduit 86 which is closed by the piston 41 of the valve 39.

A conduit 87 which connects the exhaust control valve 29 with the restoring valve 39 in the condition of the system now under consideration is closed at both ends at the valves 29 and 39 by the piston elements thereof.

A conduit 88, which connects the main control valve 24 with the air-operated indicator 43, is exhausted to atmosphere through a passage 89 in the piston 25 of the valve 24, and a conduit 90. Therefore, there is no pressure in the cylinder 44 to actuate the spring-actuated piston 45 and the semaphore remains in a position to indicate that the main control valve 24 is in normal position.

The audible means for indicating the condition of the control system to the operator provided by the whistle 54 remains inoperative so long as the control system is in normal position. A conduit 91 is closed by the piston 25 of the valve 24, said conduit 91 being in communication with a passage 92 in the piston 30 of the valve 29, a conduit 93, a passage 94 in the piston 35 of the valve 34, a conduit 95 and a conduit 96, which is connected with the whistle 54. The opposite end of the conduit 96 is closed by the piston 35 of the valve 34. Since the whistle 54 itself constitutes an exhaust to atmosphere at all times, there will be no pressure in the conduits and passages last above mentioned.

The above outline of the condition of the control system when in normal position has been thus generally described to indicate the conditions of pressure and exhaust obtaining in this normal setting of the system as a basis of further description in proper sequence of its operation, when actuated to application position and its return to normal position.

It will be convenient at this point to briefly outline the construction of the elements of the braking system.

The braking system includes as an element an automatic brake valve 97, shown in detail in Fig. 10. The body of the valve is stationary and acts as a seat for a rotary valve element 98 in the upper part thereof, said valve 98 being manually operated to its different adjustments. In the central portion of the body there is an equalizing piston 99 which comprises a piston body 100 and a piston ring 101 operating in a cylinder 102 that connects the walls of chambers 103 and 104 located above and below the piston 99, respectively. There is a recessed portion 105 on the under face of the piston 100 and mounted in said recess is a recessed cylindrical head 106 on an equalizing piston stem 107. An expansion spring 108 is seated in the recess in the piston 100 and in the head 106. The equalizing piston stem 107 is mounted for sliding engagement in the top wall of a valve housing 109. In the bottom wall of said housing 109 is a valve seat against which the lower portion of the equalizing piston stem 107 seats. There is a series of outlet ports 110 which communicate with the chamber 104. A cylindrical extension 111 is connected into the lower end of the valve housing 109, said extension having its upper end directly connected into a passage in the valve housing and its lower end formed with an opening therethrough which acts as a guide for the stem of a preliminary exhaust valve 112, which will be described in further detail hereafter. It will be understood that the stem of the preliminary exhaust valve is formed separate from the piston stem 107, but that the upper end of the stem of the preliminary exhaust valve abuts against the lower end of the piston stem 107. The cylindrical extension 111 has a port 113 through the wall thereof which exhausts to atmosphere.

A passage 114 which is connected with a conduit 115 leads to a chamber 116 above the valve member 98. There is a passage 117 in the rotary valve 98 that connects the chamber 116 with a passage 118 through the body of the valve, which passage 118 connects at its outlet end with a conduit 119. A passage 120 in the body of the valve has connected thereinto a conduit 121, said passage 120 connecting into a passage 122 in the rotary valve 98 which, in turn, connects with another passage 123 in the valve body, said passage 123 communicating with another passage 124 in the valve body, said passage 124 leading to a passage 125 in the rotary valve 98 and thence to a passage 126 in the valve body that connects into the chamber 103.

The passage 123 also connects with a passage 127 in the body of the valve, said passage 127 having connected thereinto a conduit 128. The chamber 103 connects with an equalizing reservoir 129 by means of a passage 130 leading from the valve body to a conduit 131 opening into the equalizing reservoir 129. The equalizing reservoir 129 and the chamber 103 are therefore in permanent communication to provide a combined air space, the purpose of which will appear hereinafter.

There is a passage 132 in the body of the valve which connects with a conduit 133 which passage 132, in turn, connects with a passage 134 communicating with the chamber 104. The ports 110 from the chamber 104 are normally closed by the equalizing piston stem 107. There is a passage 135 in the body of the valve which connects with a conduit 136.

The upper end of the passage 135 is closed at its upper or outlet end by the rotary valve member 98. A passage 137 in the valve body connecting at one end with a conduit 138 is connected through a passage 139 in the rotary valve member 98 with a passage 140 in the body of the valve. Said passage 140, in turn, is connected with an exhaust passage 141 in the valve body, said passage 141 being open to atmosphere at its outer end. There is also a passage 142 in the valve body that connects with the passage 140 which is closed at its outlet end by the rotary valve 98.

A passage 143 in the valve body connects into the passage 137 which is closed at its outlet end by a plug 144 and at its opposite end by the rotary valve element 98. A passage 145 in the valve body leads to the outer wall of the valve body and is closed at its outlet end by a plug 146 and at its opposite end by the rotary valve 98. A passage 147 in the valve body connects at one end into the chamber 103 and is closed at its upper restricted outlet end by the rotary valve 98.

The braking system also includes the preliminary exhaust valve 112 which is connected to and functions with the automatic brake valve 97. By reference to Fig. 10 it will be noted that the preliminary exhaust valve 112 is connected to the body of the automatic brake valve 97 by a cylindrical extension 148, said extension forming a chamber 149 which is connected to atmosphere by a port 150 through the wall thereof. To the lower end of the cylindrical extension 148 is connected a valve housing 151 which forms a chamber 152 into the lower wall of which a conduit 153 is connected.

In the chamber 152 there is a flap valve 154. The flap valve 154 comprises a central valve element 155 which has pivot connection at one end with a lug 156 formed on the inner wall of the chamber 152 and on each side of the central valve element 155 is a valve gasket 157 and 158, respectively. The lower wall of the chamber 152 has a valve seat 159 against which the valve gasket 157 seats when the valve is in depressed or closed position. There is a valve seat 160 in the upper wall of the chamber 152 against which the valve gasket 158 seats when the valve is in raised or open position. A stem 161 extends axially through the valve body which includes the elements 155, 157 and 158 and said stem carries a coiled expansion spring 162. It will be noted that the spring 162 extends beyond the end of the stem 161 and bears against an enlarged portion 163 of a stem 164 which is located axially in the chamber 149. The stem 164 extends through an opening in the member 111, said member 111 being cylindrical in form, and has an opening in one end to accommodate said stem, whereby the upper end thereof is held in alinement. The spring 162 tends to force the stem 164 upwardly so that its end lies adjacent to the lower end of the stem 107. A bracket 165 is carried by the flap valve, said bracket extending upwardly from its upper face and said bracket carrying at its upper end a bifurcated arm 166 that extends inwardly from said upper end of the bracket. The extremities of said arm extend over the upper shoulder formed by the member 163. The space between the arms of the bifurcated member is of sufficient depth that, when the valve is in depressed position, said arms will be out of contact with the stem 164 and out of contact with the member 163.

The chamber 152 is vented to atmosphere through a preliminary exhaust port 167 cut through the wall of the valve housing 151. The port 167 is relatively small in diameter and therefore a relatively slow exhaust of pressure in the chamber 152 results.

The independent brake valve 168 shown in Fig. 12 of the drawings is another element of the braking system, the essential portions of which may be generally described as follows:

The body of the valve is stationary and constitutes a seat for a rotary valve element 169 located in the upper part thereof. The valve element 169 is manually operated to its different adjustments.

There is a passage 170 into which connects a conduit 171. The passage 170 is in registration with a passage 172 in the rotary valve element 169 in all positions of the valve. The passage 172 connects into a chamber 173 located in the upper part of the valve housing and above the rotary element 169. There is a passage 174 in the body of the valve which is closed at its upper end by the rotary valve element 169 and the opposite end of said passage 174 opens to atmosphere. A passage 175 into which connects a conduit 176 is closed at its upper end by the rotary valve element 169. A passage 177 in the valve body has connected to its lower end a conduit 178 and said passage is closed at its upper end by the rotary valve element 169. A passage 179 through the valve body is connected with a conduit 180 at its lower end, said passage 179 communicating at its upper end with a passage 181 in the under face of the rotary valve element 169 by means of which it communicates with another passage 182 in the valve body, said passage 182 having a conduit 183 connected into its lower end.

Another element of the braking system is an equalizing reservoir governor 184 shown in detail in Figs. 13 and 18, in the former of which the governor is shown in normal or open position and in the latter of which it is shown in application or closed position.

The equalizing reservoir governor comprises a body portion 185 which, for the purpose of convenience of assembly, is made in two sections. A top member is attached to the upper end thereof. The governor top includes a piston 186 which is fitted for sliding engagement in a diaphragm ring 187 mounted in the top of a chamber 188 and the upper member of the body of the equalizing reservoir governor body 185. The piston 186 is circular in form and has extending axially therethrough a pin valve 189, the tapered end of which is adapted to seat in an opening 190 at the bottom of the chamber 188 when the piston is in depressed position.

A strong expansion spring 191 is mounted above the head piece of the piston 186, the upper end of said spring contacting with a screw plug 192 threaded into the upper end of a housing 193. Said screw plug is adjustable in the housing and therefore serves to adjust the tension of the spring 191. A cap nut 194 fits over the upper end of the housing 193, said cap nut being removable to permit access to the plug 192 for adjustment. There is a vent port 195 through the wall of the housing 193 which permits any pressure caused by leakage past the piston to escape from the housing 193.

The tension of the spring 191 is adjusted to withstand a predetermined maximum range of pressure in the chamber 188. That is to say, as long as the pressure in the chamber 188 remains within the predetermined limits, the piston will remain in raised position holding the pin valve 189 from its seat, as shown in Fig. 13. When the pressure in the chamber 188 drops below the tension for which the spring 191 is set, said spring will operate to force the pin valve 189 to its seat 190, as shown in Fig. 18.

A passage 196 connects into the chamber 188, said passage 196 extending through the body of the device. The lower end of the passage has connected thereinto a conduit 197. The chamber 188 is in communication through the valve port 190 with a passage 198 in the body of the device, said passage 198 communicating with a chamber 199 formed in the body of the member. There is a branch passage 200 that communicates with the passage 198 at its upper end and extends downwardly through the body portion of the device and has a conduit 201 connected to its outlet end.

A piston 202 is mounted in the chamber 199, the piston being actuated by a spring 203 disposed against the under face of the piston. The piston 202 is connected with a valve stem 204 that carries a valve plug 205 at its lower end. The piston operates in a cylinder casing 206 mounted at the top of a chamber 207 in which the valve plug 205 operates.

The chamber 207 has connected thereinto a passage 208 which leads to the exterior of the body of the device and connects with a conduit 209. There is a valve port 210 in the bottom of the chamber 207, said port constituting a seat for the valve plug 205. The chamber 207 is in communication with a passage 211 leading to the exterior of the body of the equalizing reservoir governor through the port 210. A conduit 212 connects with the lower end of the passage 211. There is a passage 213 that connects through the wall of the cylinder 206, said passage constituting a bleed port to relieve the pressure in the cylinder 206 induced by air that may leak past the piston 202 from the chamber 199 or that may leak past the valve stem 204 and the chamber 207, thus preventing pressure from being trapped beneath the piston 202 and thereby preventing any pressure that may be above the piston 202 forcing it down against the tension of the spring 203.

Figure 15:
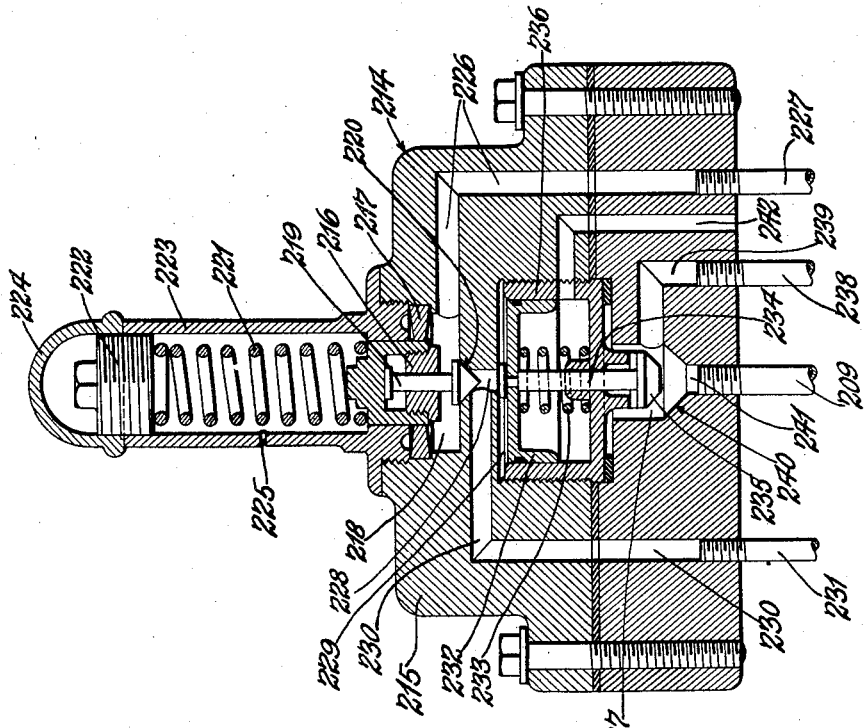
Fig. 15 is a vertical section through a locomotive brake governor shown in normal or closed position.

Another element of the brake system includes a locomotive brake governor indicated by 214, and shown in detail in Figs. 15 and 20, in the former of which the device is shown in normal or closed position and in the latter in application or open position. This element is of the same general construction as the equalizing reservoir governor and it will, therefore, be unnecessary to redescribe its construction in detail. However, to avoid confusion in the description of its operation, the operative parts thereof will be given separate reference numerals as follows:—

The body is indicated by 215 and the piston by 216, the diaphragm ring by 217, the chamber below the diaphragm by 218, the pin valve by 219, the seat for the pin valve by 220, the operating spring by 221, the screw plug by 222, the housing by 223, the cap nut by 224, the vent port by 225. A passage 226 connects the chamber 218 with a conduit 227. A passage 228 connects the chamber 218 with a chamber 229 through the port 220. A passage 230 branching from the passage 228 connects into a conduit 231. A piston 232 is actuated by a spring 233. The valve stem is indicated by 234, the valve plug by 235, the cylinder casing by 236, a chamber by 237. A passage connecting the chamber 237 with a conduit 238 is indicated by 239. A port 240 communicates a passage 241 with the chamber 237, said passage having connected thereto the conduit 209. A passage 242 constitutes a bleed port from the cylinder 236.

The braking system also includes a restricted exhaust safety valve 243, shown in Figs. 16 and 21, in the former of which this valve is shown in normal or closed position and in the latter in the application or open position. This valve includes a housing 244 in which is located a valve 245.

The valve 245 controls a passage 246 through the valve that connects with a conduit 247. The valve 245 is actuated to closed position by an expansion spring 248 that surrounds a stem 249, the lower end of which spring bears against the upper face of the valve 245. The valve 245 operates in a chamber 250, from which there is an exhaust port 251. Leading from the top of the chamber 250 is a passageway 252 that communicates with a chamber 253 formed in the upper part of the housing 244 of the valve and exhaust ports 254 lead from the chamber 253. The end of the passage 252 that enters the chamber 253 and the exhaust port 251 are controlled by the movement of the valve 245 operating as a slide valve to control the outlet openings of the passages 251 and 252. The tension of the spring 248 is adjustable and a screw plug 255 which also acts as a guide for the stem 249 is provided for the adjustment of said spring. The screw plug 255 is threaded into the housing 244 for adjustment. A cap nut 256 is screwed to the screw plug 255.

The braking system also includes a locomotive brake governor control valve 257, shown in detail in Figs. 17 and 22, in the former of which this valve is shown in normal or open position and in the latter in application or closed position.

The valve 257 comprises a housing 258 in which there is mounted a valve 259, said valve controlling a passage 260 that has connected thereto the conduit 231.

The valve 259 is normally actuated to downward or open position by an expansion spring 261 that surrounds a stem 262, the lower end of which bears against the upper face of the valve 259. The valve 259 has a restricted passageway 263 therethrough that communicates with a chamber 264. At the top of the chamber 264 there is a passageway 265 that communicates with a chamber 266 formed in the upper part of the housing 258 and there is an exhaust port 267 leading from said chamber 266. When the valve 259 is in downward adjustment there is a restricted exhaust through the passage 263 to atmosphere. Where the upper end of the passage 265 enters the chamber 266 it is controlled by the movement of the valve 259 that operates as a slide valve to control said outlet passage 265. The tension of the spring 261 is adjusted by a screw plug 268 which also serves as a guide for the upper stem 262. The screw plug threads into the upper end of the housing 258 and a screw cap 269 is threaded over the extremity of the plug 268 and extends beyond the housing.

The braking system also includes a distributing valve 270, shown in Fig. 23. The distributing valve is adapted to apply and release the locomotive brakes by control of pressure admitted thereto or exhausted therefrom which is accomplished under ordinary conditions by manual manipulation of the automatic brake valve 97 and the independent brake valve 168.

The distributing valve 270 is divided into two portions, one designated the application portion and the other the equalizing portion. It is attached to a double chamber reservoir which, for convenience of illustration and description, is shown in the drawings as part of the valve itself. The application portion of the distributing valve includes an application cylinder 271 in which there is mounted an application piston 272 provided with a graduating spring 273. A chamber 274 positioned at the right of the piston 272 (Fig. 23) surrounds the piston and spring and also an exhaust valve 275 which is actuated by the piston 272. A pasage 276 leads through the exhaust valve. The application piston 272 has a piston stem 277 that connects with an application valve 278, the application valve being provided with a passage 279. The application valve 278 is surrounded by a chamber 280 which is connected by a passage 281 to a conduit 282. The chamber 274 is permanently connected by a passage 283 in the body of the valve with a conduit 284 that leads to the brake cylinders of the locomotive and tender. Said passage 283 connects with the chamber 274 at two places and also branches to the exterior of the valve, said branch being normally closed by a plug which may be removed for the purpose of drainage when necessary.

A passage 285 in the body of the valve also connects into the chamber 274 at two places, said passage 285 constituting an exhaust passage to atmosphere. The passage 285 is controlled by the movement of the exhaust valve 275 which, in turn, is actuated by the application piston 272.

The equalizing portion of the distributing valve 270 includes an equalizing piston chamber 286 in which is mounted an equalizing piston 287 which actuates a graduating valve 288 and an equalizing slide valve 289.

The chamber 286 into which a conduit 290 connects has a feed groove 291 in its upper wall that connects the chamber 286 with an equalizing slide valve chamber 292, said chamber 292 surrounding the piston 287 and the valves 288 and 289. The chamber 292 is permanently connected by a passage 293 to a pressure chamber 294. In the wall of the chamber 286 is a graduating stem 295 and a graduating spring 296. The graduating valve 288 is provided with a passage 297, and the equalizing slide valve 289 is provided with passages 298, 299, 300, 301 and 302. A passage 303 permanently connects the application cylinder 271 with a conduit 304, said passage 303 branching into three outlet passages in the body of the valve beneath the equalizing slide valve 289. A passage 305 extends through the valve and has connected to its outer end the conduit 180. A passage 306 is permanently connected into an application chamber 307 and a passage 308 is permanently connected with a safety valve 309.

The remaining elements of the braking system, including a reducing valve 310, a train control feed valve 311, a feed valve 312, a check valve 313, a train control feed valve safety valve 314, a double-heading cock 315 and a pump governor 316, are of usual and known construction and it will only be necessary to give a brief description of their functions in connection with the description of the operation of the braking system.

In describing the operation of the control elements of the braking system and their relation one to the other as a braking system it will be assumed that the position of the elements 1, 24, 29, 34 and 39 of the control system are in normal position; and likewise that the automatic brake valve, the preliminary exhaust valve, the independent brake valve, the equalizing reservoir governor, the locomotive brake governor, the restricted exhaust safety valve, the locomotive brake governor control valve and the distributing valve are all in normal position.

It will be understood that in the operation of the braking system certain of the conduits and control elements are supplied with air pressure at all times and irrespective of the position of the control elements of either the control system or the braking system.

The air pressure for the operation of the braking system originates in the main reservoir 55, said pressure being induced as hereinbefore described, and is maintained at about 90 pounds. Pressure from the main reservoir is delivered to the valve 34 through the conduit 56. The conduit 56 is, therefore, supplied with main reservoir pressure at all times, regardless of the position of the movable member 35 of the valve 34.

The conduit 56 branches at 317 and connects with a conduit 318 leading to the reducing valve 310. The reducing valve 310 is of known construction and its function is merely to reduce the main reservoir pressure.

In practice, if the main reservoir pressure is approximately 90 pounds, the pressure is reduced by the valve 310 to approximately 45 pounds maximum pressure.

The outlet conduit 171 leads from the valve 310, which conduit connects into the passage 170 of the valve 168, said passage 170 registering in normal or running position as well as in other positions of the brake valve with the passage 172, thereby conducting the reducing valve pressure into the chamber 173 above the rotary valve element 169 at all times. The purpose of thus introducing pressure above the rotary valve element is to hold said element to its seat and to have available reducing valve pressure for locomotive brake applications under other adjustments of the valve 168.

A conduit 319 which leads from the reducing valve 310 to the valve 24 is also supplied with reducing valve pressure to the maximum pressure of 45 pounds at all times. The conduit 319 is closed at its outlet end by the movable member 25 of the valve 24.

It will be noted that the conduit 56 branches at 320 into the conduit 282 which connects into the distributing valve 270. Since the conduit 282 connects into the passage 281 of the distributing valve, said passage 281, in turn, connecting with the chamber 280 surrounding the application valve 278, it is evident that the chamber 280 will be constantly supplied with main reservoir pressure. The main reservoir pressure in the chamber 280 makes constantly available pressure for the application of the locomotive brakes.

The conduit 56 also branches at 321 into a conduit 322 leading to the train control feed valve 311. The train control feed valve 311 functions to reduce the main reservoir pressure to approximately 49 pounds maximum. The reduced pressure is conducted constantly through a conduit 323 to the valve 34. The conduit 323 is closed at its outlet end by the movable member 35 of the valve 34.

The conduit 56 again branches at 324 into a conduit 325 leading to the feed valve 312. The feed valve 312 reduces the main reservoir pressure to approximately 70 pounds. The reduced pressure of the feed valve 312 is connected to the valve 34 by a conduit 326. The conduit 326 is, therefore, constantly supplied with feed valve pressure, thereby maintaining available a predetermined pressure for the brake pipe or train line through the automatic brake valve, thereby compensating for any leakage in the system.

A conduit 327 which connects the main reservoir 55 with the high pressure head 328 of the pump governor 316 is also supplied with main reservoir pressure at all times. The high pressure head 328 is inoperative in the normal or running position of the brake system.

In the description heretofore given in relation to the supply of pressures it has been assumed that the pressures were supplied regardless of the position of the control elements. The following description assumes that the pressures are placed under the control of the control elements.

It will be remembered that the conduit 56 is supplied with main reservoir pressure at all times. This pressure is conducted through a passage 329 of the valve 34 to a conduit 330 which connects into the check valve 313. The opposite end of the valve is connected by the conduit 115 with the valve 97. The check valve 313 is of usual construction and acts as a back pressure valve reversely to the flow of pressure through the conduits 330 and 115. The conduit 115 connects with the passage 114 of the valve 97 which leads to the chamber 116 above the rotary valve 98. The purpose of delivering main reservoir pressure to the top of the rotary valve is to hold the rotary valve to its seat and to have main reservoir pressure available for recharging the braking system, as will be described hereinafter.

Main reservoir pressure from the chamber 116 is conducted through the passages 117 and 118 of the valve 97, the conduit 119, a passage 331 of the valve 34 and a conduit 332 to the low pressure head 333 of the pump governor 316.

The function of the low pressure head 333 of the pump governor 316 is to control the operation of the pump for maintaining pressure in the main reservoir 55 when the system is in normal or running position. When the pressure remains within the normal operating limits the pump is idle. When the pressure in the conduit 332 and, therefore, the pressure in the low pressure head 333 of the governor 316 drops below the predetermined minimum a steam valve 334 will operate to initiate operation of the pump by admitting steam thereto. When the pressure again rises sufficiently to bring the pressure in the low pressure head 333 of the governor 316 within the normal operating limits the operation of the pump is stopped. In normal or running position of the brake system and the normal position of the control system the high pressure head 328 of the governor 316 does not function because the setting of the valve in the high pressure head is such that it will not be operated to control the pump by the low pressure that is supplied through the conduit 327 direct from the main reservoir 55.

It will be remembered that the conduit 326 is supplied with a predetermined feed valve pressure at all times. This pressure is conducted through a passage 335 of the valve 34, the conduit 121, and the passages 120, 122, 123, 124, 125 and 126 to the chamber 103 on the upper side of the equalizing piston 99. As a result of these connections a predetermined pressure is maintained in the chamber 103 and hence against the upper side of the equalizing piston 99 by the feed valve 312. The chamber 103 is connected by the passage 130 and the conduit 131 to the equalizing reservoir 129 which obviously will have an internal pressure equal to that in the chamber 103. The conduit 197 connects the equalizing reservoir 129 with the equalizing reservoir governor 184, the conduit 197 connecting into the passage 196 of the governor 184 which leads to the chamber 188 beneath the piston 186.

In order to bring out the operative features of the device it will be assumed in the present description that the spring tension of the spring 191 is adjusted to withstand a pressure of fifty pounds beneath the piston 186 and since it will not overcome the pressure in the chamber 188 the piston will raise the pin valve 189 from its seat 190. Therefore, so long as the passage 196 maintains a predetermined pressure in the chamber 188 the port 190 will be open, thus connecting the chamber 188 with the chamber 199 through the passage 198 and also by the passage 200 and the conduit 201 with the valve 34. The outlet end of said conduit 201 is closed by the movable member 35 of the valve 34.

From the connections described it is obvious that the chamber 103 above the equalizing piston 99, the equalizing reservoir 129 and the chambers 188 and 199 will have an equal pressure which, under the initial pressure assumed, will be approximately 70 pounds supplied from the feed valve 312. In connection with the equalizing reservoir governor 184 it should be noted that the piston 202 with its attached valve plug 205 is forced downwardly against the tension of the spring 203. This has the effect of breaking communication between the chamber 207 and the passage 211 inasmuch as the valve plug 205 is on its seat 210. The valve plug 205 therefore acts as a control for the passage 211 and the chamber 207.

The passage 123 of the valve 97 is supplied with feed valve pressure as above described. It should be noted that the passages 123 and 127, the conduit 128, a passage 336 which intersects a passage 337 of the valve 34, the conduit 133 and the passages 132 and 134 of the valve 97 connecting into the chamber 104 will maintain a pressure of 70 pounds in the chamber 104 and against the under side of the equalizing piston 99. The pressure on both sides of the equalizing piston 99 will be equal and, therefore, the stem 107 will be held to its seat to close the exhaust ports 110 in the lower part of the chamber 104 holding the pressure in said chamber.

With reference to the passage 337 of the valve 34 that is supplied with feed valve pressure, as above described, it will be noted that said passage 337 connects at its lower or outlet end with a conduit 338 that forms a branch of a brake pipe 339. The conduit 338 has interposed therein the double heading cock 315 of known construction and the normal position of which is open. The conduit 338 connects into the extension 339 of the brake pipe of the train brake system. As a result of these connections it will be understood that a feed valve pressure is maintained in the train brake line, thereby holding the air brakes in release position on the train. The pressure in the train brake line will be equal to the pressure in the chambers 103 and 104 of the valve 97 and to the pressure in the equalizing reservoir 129.

Another extension 290 of the brake pipe line 339 leads from the conduit 338 to the distributing valve 270. The conduit 290 connects into the equalizing piston chamber 286 and, as the normal feed valve pressure is delivered thereto through the connections above described, the equalizing piston 287 is moved to a position in which the feed groove 291 connecting into the equalizing slide valve chamber 292 is open. The chamber 292 is in turn permanently connected to the pressure chamber 294 through the passage 293. As the ports of the equalizing slide valve 289 are closed by the graduating valve 288 when the distributing valve is in running position, it is obvious that the equalizing piston chamber 286, the equalizing slide valve chamber 292 and the pressure chamber 294 will have an air pressure charge equal to the pressure in the brake pipe 290.

While the pressures on both sides of the equalizing piston 287 remain equal, that is to say, the pressures in the equalizing piston chamber 286 and the equalizing slide valve chamber 292, the equalizing piston actuates the graduating valve 288 and the equalizing slide valve 289 to the left, as shown in Fig. 23. The result of this adjustment of the equalizing slide valve 289 is the connection of certain passages in the body of the valve beneath the equalizing slide valve 289. The result of the connection of these passages is the control of certain passages in the elements of the control system and certain passages, chambers and conduits of the braking system. For purposes of clearness of description these passages, chambers and conduits will be grouped and described separately, following which the control of the same by the equalizing slide valve 289 will be described.

The first group concerns the application cylinder connections. This group includes the application cylinder 271 of the distributing valve 270 (Fig. 23) which is permanently connected with the equalizing slide valve body by the passage 303 which branches into three outlet openings in said valve body beneath the equalizing slide valve 289. The passage 303 has connected thereinto the conduit 304 which branches at 340 into the conduit 176 which connects with the passage 175 of the independent brake valve 168 (Fig. 12). The conduit 304 branches at 341 into the conduit 136 which connects with the passage 135 of the automatic brake valve 97 (Fig. 10). The conduit 304 also branches at 341 into the conduit 227 which connects with the passage 226 terminating in the chamber 218 of the locomotive brake governor 214 (Figs. 15 and 20). The conduit 304 also branches at 341 into the conduit 238 which connects with the passage 239 terminating in the chamber 237 of the locomotive brake governor 214 (Figs. 15 and 20).

From the above description of the application cylinder connections it will be obvious that the pressure conditions in these connections will be the same as those in the application cylinder 271. This group of connections is not changed by a change of position of any of the elements of the control or braking system as they are permanently connected in all positions assumed in the different operations or adjustments affecting the system.

There is another group of connections relating to the release of the distributing valve and which concern the distributing valve release connections. This group includes the passage 305 in the body of the equalizing slide valve of the distributing valve 270 (Fig. 23). Said passage 305 connects with the conduit 180 which connects with the passage 179 of the independent brake valve 168 (Fig. 12), said passage 179 being connected with the passage 182 by the passage 181 in the valve 168. The passage 182 connects with the conduit 183 which is connected with a conduit 342 through a passage 343 of the main control valve 24 (Fig. 4). The conduit 342 connects with the conduit 138 through a passage 344 of the valve 34 (Fig. 2). The conduit 138 connects with the passage 137 of the automatic brake valve 97 (Fig. 10). Since said passage 137 connects through the passages 139, 140 and 141 of the valve 97 with atmosphere it is evident that the passage 305 of the distributing valve 270 will be open to exhaust when the valves 168, 24, 34 and 97 remain in normal position. The exhaust of pressure through the passage 305 and the connections above described can therefore be controlled by any of said valves last mentioned when in other than their normal positions.

The control of the application cylinder connections and the distributing valve release connections by the equalizing slide valve 289 will now be described.

When the distributing valve 270 is in normal or running position, as shown in Fig. 23, the passage 299 of the equalizing slide valve 289 connects the application cylinder connections with the distributing valve release connections and as the distributing valve release connections are open to exhaust when the valves 168, 24, 34 and 97 are in normal position it is evident that the application cylinder connections, including the application cylinder 271 and the chambers 218 and 237, are likewise open to exhaust.

The equalizing slide valve 289 also acts as a control for the application portion of the distributing valve 270. This is accomplished in the following manner:

As there is no pressure in the application cylinder 271 the application piston 272 is therefore forced to the position shown in Fig. 23 which carries with it the application valve 278. This closes the port 279 and the main reservoir pressure delivered to the chamber 280 as above described is retained therein. The application piston 272 has the further function of moving the exhaust valve 275 to the position shown in the drawings (Fig. 23). In this position the passage 276 registers with one of the outlet openings of the passage 285 leading to atmosphere and, since the exhaust valve also opens the other outlet opening of the passage 285, any pressure that may be in the chamber 274 and also in the conduit 284 that connects with the brake cylinders of the locomotive and tender exhausts, since the conduit 284 connects into the passage 283 which is permanently connected with the chamber 274. Therefore, the brakes of the locomotive and tender are in release position as long as the application cylinder 271 is without pressure and the application portion of the distributing valve is in the position shown in Fig. 23.

The equalizing slide valve 289 further acts as a control for the application chamber 307 and the safety valve 309 of the distributing valve 270. As the passage 299 of the equalizing slide valve 289 connects the application chamber 307 through the passage 306 with the distributing valve release connections and furthermore, as the safety valve 309 is connected with the same connections because the passage 308 is in registration with the passage 303 through the passage 302, said passage 303 being connected with the passage 305 through the passage 299, it therefore follows that the application chamber 307, the safety valve 309 and the connections just described are open to atmosphere.

The equalizing slide valve 289 also acts as an indirect control for other connections, and chambers and passages in the elements of the braking system by its control of the application cylinder connections when in normal position. In order to clarify the description, these connections will be grouped first and the operation of the elements of the braking system directly concerned in their control will then be described.

This group of connections constitutes supply connections for the application cylinder connections and will be referred to hereinafter as the application cylinder supply connections. They include the conduit 212 which is connected at one end into the main control valve 24 (Figs. 4 and 5) and at its other end into the passage 211 of the equalizing reservoir governor 184 (Figs. 13 and 18).

The passage 211 is connected with the chamber 207 through the port 210. The chamber 207 is in turn connected with the passage 208 into which the conduit 209 connects. The conduit 209 connects into the passage 241 of the locomotive brake governor 214 (Figs. 15 and 20). The passage 241 is connected with the chamber 237 through the port 240. As the chamber 237 is a part of the application cylinder connections, it is therefore evident that the application cylinder supply connections are connected with the application cylinder connections at the port 240 of the locomotive brake governor. The purpose of these connections is to supply a supplemental pressure to the application cylinder 271 of the distributing valve 270 as will be described hereinafter. However, it will suffice for the present to state that the pressure conditions in these connections are directly controlled by the valve 24, the equalizing reservoir governor 184, the locomotive brake governor 214 and the locomotive brake governor control valve 257. This control will now be described, considering the system as being in normal position.

It will be noted by reference to Fig. 4 that the conduit 212 is closed by the movable member 25 of the valve 24 when in normal position. It will be remembered that the valve plug 205 of the equalizing reservoir governor 184 (Fig. 13) is forced downwardly to its seat 210 due to feed valve pressure being supplied to the chamber 199 above the piston 202 and that this has the effect of breaking communication between the chamber 207 and the passage 211.

As the conduit 212 is connected into the passage 211 it is evident that the conduit 212 will be closed at both its outlet ends and does not function in this adjustment of the device The operation of the locomotive brake governor (Fig. 15) and the operation of the locomotive brake governor control valve (Fig. 17) in controlling the application cylinder supply connections will now be described. The locomotive brake governor 214 similar to the equalizing reservoir governor 184 constitutes an adjustable device. The tension of the spring 221 is adjusted to withstand a predetermined maximum range of pressure in the chamber 218. The locomotive brake governor control valve 257 also constitutes an adjustable device. The tension of the spring 261 is adjusted to withstand a predetermined maximum range of pressure in the passage 260 beneath the valve 259.

In considering the functioning of the device it will be assumed that the spring 221 is adjusted to withstand a pressure of 40 pounds while the spring 261 is adjusted to withstand a pressure of approximately 42 pounds.

There is a coordination between the adjustment of the springs 221 and 261 that is necessary to the functioning of the governor 214 and the governor control valve 257, this function being to control the application cylinder supply connections when the control system is in normal position. The purpose of this coordinated adjustment will become further apparent when the device is explained in its operation to application position, it being sufficient for the present purpose to state that, as the chamber 218 of the locomotive brake governor is without pressure in normal condition of the system due to the connection of said chamber 218 with the application cylinder connections, said application cylinder connections being open to atmosphere through the passage 299 of the equalizing slide valve 289 and the distributing valve release connections, as hereinbefore described, the spring tension of the spring 221 will force the piston 216 and the pin valve 219 downwardly, thus breaking communication between the chamber 218 and the passage 228 since the port 220 is closed. Since any pressure that would act in opposition to the spring 261 bearing against the valve 259 of the locomotive brake governor control valve 257 is supplied from the chamber 218 through the port 220 to the passage 260 beneath the valve 259 and since the port 220 is closed, it will be obvious that, since there is insufficient pressure to raise the pin valve 219 from its seat, there will not be sufficient pressure in the passage 260 to force the valve 259 upwardly in opposition to the tension of the spring 261. The valve 259 of the locomotive brake governor control valve 257 (Fig. 17) will therefore be forced downwardly to its open position which results in the following operation:

The chamber 229 above the piston 232 is connected through the passages 228 and 230 of the governor 214 with the conduit 231 which connects into the passage 260 of the control valve 257. The passage 260 connects with the chamber 264 through the restricted passage 263 in the valve 259. Since the chamber 264 connects with the chamber 266 through the passage 265, said chamber 266 being open to atmosphere through the exhaust port 267, it is evident that the chamber 229 of the governor 214 will be without pressure. Therefore, the piston 232 with its attached valve stem 234 and the valve plug 235 will be forced upwardly by the tension of the spring 233. This will open the port 240 that connects the chamber 237 with the passage 241.

As the passage 241 has connected thereinto the conduit 209 which, in turn, is connected into the passage 208 which leads to the chamber 207 of the equalizing reservoir governor it is evident that the chamber 207 will be connected with the chamber 237. Since this portion of the application cylinder supply connections is connected with the application cylinder connections by reason of being in communication with the chamber 237 and since the chamber 237 is open to atmosphere it follows that they likewise will be open to atmosphere so long as the equalizing slide valve 289 remains in the normal position, as shown in Fig. 23.

The apparatus is designed so that when all of the elements of the control system are in normal position the independent brake valve 168 may be operated to release the locomotive brake in the normal manner. Broadly, the application and release of the locomotive brakes under control of the independent brake valve is by controlling the pressure in the application cylinder of the distributing valve. The application of the locomotive brakes by the valve 168 in the usual manner is not interfered with nor changed regardless of the position of the various control elements, nor is the release operation of this valve when the control system is in normal position.

The group of conduits and passages associated with this release operation will now be described and they will be designated as the independent unrestricted release connections.

By reference to Fig. 12 it will be noted that the valve 168 is provided with the conduit 178 that connects into the passage 177 in the valve. When the valve 168 is in running position the end of the passage 177 is closed by the rotary member 169 of said valve. The conduit 178 leads to the valve 24 and connects with a conduit 345 through a passage 346 in the movable member 25 of the valve 24. The conduit 345 leads to the valve 39 and connects with a conduit 347 through a passage 348 in the movable member 41 of the valve 39. The conduit 347 then leads to the valve 34 through which it connects with the manifold exhaust conduit 81 through a passage 349 in the movable member 35 of the valve 34.

From this train of connections it will be understood that the passage 177 in the valve 168 is directly connected with exhaust and that so long as the valves 24, 39 and 34 remain in normal position the conduit 178 is likewise connected with exhaust. Therefore, by manipulation of the valve 168 to release position the conduit 178 may be placed in communication with the conduit 176 by the rotary member 169 of the valve 168. Any pressure in the conduit 176 may therefore be released to atmosphere when it is desired to release the locomotive brakes either in whole or in part by control of the pressure in the application cylinder connections. Therefore, the operator has the locomotive brakes under usual control so long as the valves controlling the conduit 178 remain in normal position.

The unrestricted operation of the valve 168 obtains only when the system is in normal condition. When the train and locomotive brakes have been applied through the control system the control through the valve 168 is restricted. The group of conduits and passages associated with the restricted operation of the valve 168 will now be described and they will be referred to hereinafter as the independent restricted release connections.

The connections comprise a conduit 350 which is closed at its inlet end by the movable member 25 of the valve 24, a passage 351 of the valve 39 and a conduit 352 connected into the conduit 247 at 353, which said conduit 247 is closed at its inlet end by the movable member 35 of the valve 34 and connected at its outlet end to the passage 246 of the restricted exhaust safety valve 243 (Figs. 16 and 21). These connections are associated with the application cylinder connections to effect a restricted release of the same through the conduit 176 when the valve 168 is placed in release position when the valve 24 or the valve 34 is in application position, as the independent restricted release connections are designed to change the independent unrestricted release connections into restricted ones. By reference to Fig. 5 it will be noted that when the valve 24 is in application position the conduit 178 is placed in communication with the conduit 350 through a passage 354 in which there is a groove 355 at its inlet end. Also by reference to Fig. 3 it will be noted that when the valve 34 is in application position the conduit 347 is placed in communication with the conduit 247 through the passage 349. It should therefore be borne in mind that so long as the control system is in normal position the independent restricted release connections for the valve 168 are inoperative.

The operation of the restricted exhaust safety valve 243 (Fig. 16) mentioned above will now be described.

The restricted exhaust safety valve 243 is an adjustable device, the spring tension of the spring 248 being adjusted so as to withstand a predetermined maximum range of pressure in the passage 246 beneath the valve 245. The adjustment of the spring 248 is in coordination with the springs 221 and 261, the purpose of which is to control the governor 214 and the control valve 257, and through them the application cylinder supply connections. Upon the assumptions of pressures and adjustments heretofore made the spring 248 will be assumed to be adjusted to withstand a pressure of approximately 43 pounds. In the normal position of the system the passage 246 is without pressure and therefore the valve 245 is held in closed position as shown in Fig. 16.

The preliminary exhaust valve 112 as previously explained is connected to and functions with the automatic brake valve 97. It will be remembered that the pressure on both sides of the equalizing piston 99 of the valve 97 is equal and that the equalizing piston stem 107 is held to its seat. The stem 107 will therefore force the stem 164 and the element 163 downwardly against the tension of the spring 162. The tension of the spring 162 acting against the top of the valve 154 will force said valve 154 to its seat 159, thereby closing communication between the chamber 152 and the conduit 153.

As the conduit 153 is connected with a conduit 356 through a passage 357 having a groove 358 at one of its outlet ends in the movable member 35 of the valve 34, said conduit 356 connecting at 359 into the multiple exhaust conduit 81, it is evident that the flap valve 154 will remain on its seat 159 due to the absence of pressure in the conduit 153. The valve 112 will therefore remain in its normal or closed position.

In this position of the valve the bifurcated arm 166 will be free from the stem 164 and the element 163, the full purpose of which construction will be explained hereinafter.

The train control feed valve safety valve 314 is set to withstand a pressure of 50 pounds and is connected by a conduit 360 to the movable element 35 of the valve 34. The function of the train control feed valve 311 will be explained hereinafter when the valve 34 is described in application position.

From the foregoing description of the condition of the various connections and control devices of both the control system and the braking system in normal or running position it will be noted that so long as the valves 1, 24, 34 and 39 of the control system remain in the normal position operation of the braking system in the normal manner by the operator through the manipulation of the valves 168 and 97 is not restricted or changed. This manipulation and its effect on the pump governor 316 and the distributing valve 270 and the train brakes connected with the brake pipe or train line follows the usual operation of these devices and further description is not therefore considered necessary.

From the normal or running position under the influence of the main electrical control valve a sequence of changes in the control system occurs, which operations will now be described:

Through any suitable means when the track conditions are unsafe the main electrical control valve 1 operates. The circuit with which the leads 3 and 4 are connected is de-energized, thereby de-energizing the field 2 of the valve 1. When this occurs, through the action of the spring 6 and the action of the weight of the armature 5 and the carried valve structure, the armature is dropped. The movement of the armature results in the following change in condition in the control system:

The valve 12 seats and therefore closes the port 17 from the chamber 16 to the passage 18, thereby closing off the main reservoir pressure in the conduit 62. Simultaneously therewith the valve 11 opens. Therefore, the main reservoir pressure which is constantly supplied by the conduit 60 which enters the chamber 16 passes through the port 14 into the chamber 22, from which it leaves the valve through the passage 21 that connects with the conduit 27 leading to the application chamber of the valve 24. The exhaust of the conduit 27 to atmosphere is closed and it is supplied with main reservoir pressure. The conduit 27 formerly open to atmosphere now is supplied with main reservoir pressure from the chamber 16, the valve 9 being closed to prevent the escape of pressure from said conduit 27.

Likewise, simultaneously the valve 10 opens the port 13 and main reservoir pressure formerly in the passage 18 and the chamber 19 is exhausted through the passage 20 and the multiple exhaust conduit 65. Main reservoir pressure in the conduit 64, which under the normal setting of the control system is shut off by the movable member 30 of the valve 29, now exhausts through the passage 63 of the valve 39 and the conduit 62 which is connected with the passage 18 and the chamber 19. The pressure supplied to the conduit 64 provides means for returning the valve 24 to normal position following an application, but this pressure is immediately exhausted when the valve 1 assumes the application position so that there can be no pressure in the normal chamber of the valve 24 to act in opposition to pressure delivered to the application chamber thereof by the conduit 27 when the valve 1 is in application position and after the valve 29 assumes application position.

The second element of the control system to assume the application position is the main control valve 24. The admission of pressure to the application chamber of the valve 24 through the conduit 27 actuates the movable member 25 of said valve to the position shown in Fig. 5. The pressure in the normal chamber is open to atmosphere through the conduit 28 and the conduit 72 and the multiple exhaust conduit 65, as the passages 71 and 70 of the valve 29 in normal position connect said conduits 28 and 72.

Simultaneously with the valve 24 assuming application position, the conduit 67 which is being supplied with pressure by reason of its connection with the conduit 27 is connected with the conduits 88 and 91 through the groove 68 and the passage 69. The conduit 88 as previously explained leads to the indicator 43 and, therefore, as the cylinder 44 is supplied with pressure, the spring-operated piston 45 is forced upwardly, thereby causing the semaphore arm 53 to assume the danger or horizontal position. This acts as an indication to the operator that the control system is moving to application position and, as heretofore stated, is the visible means for indicating to the operator the position of the valve 24. At the same time the audible means for indicating to the operator the condition of the system through the whistle 54 is brought into operation. Pressure supplied through the conduit 91, the passage 92 of the valve 29, the conduit 93, the passage 94 of the valve 34 and the conduits 95 and 96 causes the whistle to sound an audible alarm that the control system is moving to the application position. These connections are, however, only temporary and the application of the valve 24 is promptly followed by the application of the valves 29 and 34.

The conduit 66 is now closed at its outlet end at the valve 24. The purpose of closing the conduit 66 will be explained hereinafter.

Pressure normally supplied to the conduit 86, upon the valve 24 assuming application position, exhausts through the conduit 90 since the passage 89 brings the conduit 86 into registration with the conduit 90. The purpose of these connections will be explained hereinafter.

The conduit 61 is constantly supplied with main reservoir pressure and, upon the valve 24 assuming application position, is connected with the conduit 73 through the groove 85 of the passage 84 and a branch passage 361. The conduit 73 is closed at its outlet end by the valve 39 in normal position but is connected at 362 with the conduit 32 which connects into the application chamber of the valve 29. The conduit 37 which leads into the application chamber of the valve 34 is also supplied with main reservoir pressure through the groove 85 of the passage 84, the conduit 82, which is connected at 83 into the conduit 37 now being connecter with the conduit 61. The conduit 37 at its opposite end connects with a conduit 78 through the passage 77 of the valve 29 in normal position, said conduit 78 registering with the conduit 80 which connects into the multiple exhaust conduit 81 through the restricted passage 79 of the valve 39 in normal position. As these connections are supplied with pressure for the purpose of forcing the valve 34 to application position, the passage 79 is restricted in size so that the pressure cannot escape fast enough to prevent it from moving the valve 34 to the application position should the valve 29 fail to assume the application position. However, the application of the valves 29 and 34 is so timed that it is practically simultaneous with the application of the valve 24.

The third control element to assume application position is the exhaust control valve 29, the admission of pressure to the application chamber of which, through the conduit 32, actuates the movable member 30 thereof to the position shown in Fig. 9. The pressure in the application chamber of said valve is free to act to move the movable member because the opposite end of the valve is open to exhaust through the conduit 33, the passage 74 of the valve 39 in normal position, the conduits 75 and 76 and thence to the multiple exhaust conduit 65.

As the valve 29 operates substantially simultaneously with the valve 24, pressure supplied by the conduit 91 from the valve 24 to the whistle 54 will be closed off by the movable member 30 of the valve 29, since the passage 92 no longer connects the conduits 91 and 93 when the valve 29 assumes application position. The conduit 93 which leads to the valve 34 is brought into registration with the conduit 64 through the passage 71 and a branch passage 363. At the same time, the conduit 28 that leads from the normal chamber of the valve 24 is also brought into registration with the conduit 64 through the groove 70, the passage 71 and the branch passage 363. The connection between the conduits 28 and 72 is also broken by the movable member 30 of the valve 29 in its application position.

It will be remembered that the conduit 64 is open to atmosphere through the main electrical control valve 1 in application position. Therefore, the conduits 93 and 28 will be open to atmosphere so long as the valve 1 remains in application position. These connections insure that the normal chamber of said valve 24 will be free of pressure and therefore there will be no opposition to the movement of the piston of said valve due to pressure in the application chamber thereof. These connections also provide an advance setting preparatory to the return of the control system to normal position, following the restoration of the valve 1 to normal position, as will be explained hereinafter.

The conduit 37 is brought into registration with the conduit 87 through the passage 77 and out of registration with the conduit 78. The conduit 87 is closed at its outlet end by the movable member 41 of the valve 39 in normal position. Therefore, it is evident that the pressure will no longer escape from the conduit 37 when the valve 29 assumes application position. The function of the conduit 87 will be explained hereinafter. However, it may be stated that the combination of connections above described constitutes an advance setting of the controls preparatory to their return to normal position, following the restoration of the valve 1 to normal position.

The fourth control to assume application position is the valve 34. Admission of pressure to the application chamber of the valve 34 through the conduit 37 actuates the movable member 35 of said valve to the position shown in Fig. 3 of the drawings, that is to say, application position. As the normal chamber of the valve is open to exhaust through the conduit 38, the passage 74 of the valve 39 in normal position, the conduits 75 and 76, and thence to the multiple exhaust conduit 65, there is no opposing pressure to prevent movement of the movable member by pressure admitted to the application chamber. Upon the valve 34 assuming application position the conduit 56 which it will be remembered is supplied with main reservoir pressure constantly is brought into registration with the conduit 96 leading to the whistle 54, thereby causing an audible signal to inform the operator of the condition of the system. When the conduit 96 is supplied with pressure, the conduit 95 that connected with the conduit 96 is closed at the valve 34 when in application position. Therefore, as long as the valve 34 remains in application position the whistle 54 will continue to sound the audible signal, regardless of the position of the other control elements of the control system.

When the control system has thus been placed in application position following the assumption of application position by the main electrical control valve 1, the valves 24, 29 and 34 also are in application position but the valve 39 remains in normal position.

It is necessary to operate manually the valve 39 before the control system can be returned to normal position. When the valve 39 is moved to application position (Fig. 7) prior to the valve 1 assuming application position and with the valves 24, 29 and 34 in normal position the following changes occur:

The conduit 66 from the valve 24 is connected with the conduit 73 through a pasage 364 of the valve 39. The conduit 73 connecting at 362 into the conduit 32 which connects into the application chamber of the valve 29 is closed by the valve 24. As the conduit 66 is connected with the conduit 67 which is open to atmosphere through the valve 1 the application chamber of the valve 29 will be open to atmosphere through these connections. The conduit 75 which connects the normal chamber of the valve 29 and the normal chamber of the valve 34 with atmosphere through the passage 74 of the valve 39 is closed by the movable member 41 of the valve 39. At the same time pressure delivered to the conduit 86 from the valve 24 enters the normal chamber of the valve 29 through the conduit 33 and the normal chamber of the valve 34 through the conduit 38 as the conduits 86, 33 and 38 come into registration through the pasage 74 of the valve 39. The conduit 62 through which pressure from the valve 1 to the conduit 64 was delivered is closed by the movable member 41 of the valve 39 as the passage 63 no longer connects said two conduits. The conduit 64 in which pressure was trapped at the valve 29 is now connected with the conduit 76 leading to the multiple exhaust conduit 65 as the passage 63 of the valve 39 places the conduits 64 and 76 in registration.

The conduit 37 which connects the application chamber of the valve 34 with the valve 29, as it is connected with the conduit 78 through the passage 77 of the valve 29, is now closed by the movable member 41 of the valve 39, as the passage 79 no longer connects the conduits 78 and 80. Since the conduit 82 leading from the valve 24 connects into the conduit 37 it is likewise closed. The conduit 87 from the valve 29 by reason of the valve 39 being in application position is connected with the conduit 80 leading to the multiple exhaust conduit 81, thereby bringing conduits 87 and 80 into registration through the restricted passage 79 of the valve 39.

When restoring valve 39 is in application position and, following this adjustment of the valve 39, the valve 1 is moved to application position, the following operation results:

The conduit 27 immediately supplies pressure to the application chamber of the valve 24. The conduit 67, since it is connected with the conduit 27, is also supplied with pressure as well as the conduits 66, 73 and 32 through the valve 24 in normal position and the valve 39 in application position. Therefore, the application chamber of the valve 29 will be supplied with pressure from the valve 1 at the same time as the application chamber of the valve 24. However, as there is no change in the condition of the normal chamber of the valve 24 resulting from the valve 39 being in application position the movement of the valve 24 to application position (Fig. 5) is practically simultaneous with the application of the valve 1. Therefore, the following changes in the conduits and passages of the control system results:

The pressure in the conduit 61 is conducted through the groove 85, the passage 84 and the branch passage 361 of the valve 24 to the conduit 73 and thence through the conduit 32 to the application chamber of the valve 29. However, as the conduit 73 is brought into registration with the conduit 66 when the valve 39 is in application position through the passage 364 the conduit 66 is supplied with pressure. Since the conduit 66 is closed at its outlet end by the movable member of the valve 24 an application position there can be no escape of pressure therefrom and it will operate to force the valve 29 to application position. Simultaneously with pressure entering the application chamber of the valve 29 the application chamber of the valve 34 is supplied with pressure from the conduit 61 through the groove 85 and the passage 84 of the valve 24 and thence through the conduits 82 and 37. The pressure thus supplied forces the valve 34 to application position.

In order to insure that the pressure operating to force the valves 29 and 34 to application position will not be opposed by pressure in the normal chamber of said valves, said normal chambers are connected with atmosphere and any pressure therein is exhausted therefrom immediately upon the valve 24 assuming the application position when the valve 39 is in application position. The conduit 86 by which pressure is supplied to the normal chambers of the valves 29 and 34 when the valve 24 is in normal position is brought into registration with the conduit 90 leading to exhaust through the passage 89 of the valve 24 in application position.

As the conduit 86 is connected with the conduits 33 and 38 leading to the normal chambers of the valves 29 and 34, respectively, through the passage 74 of the valve 39 in application position there will be no pressure in the normal chambers of said valves. Therefore, pressure in the application chambers of said valves will operate to force them to application position regardless of any premature application of the valve 39.

The movement of the valves 29 and 34 to application position is substantially simultaneous with the application of the valve 24 when the valve 39 is prematurely moved to application position.

When the valve 29 is brought to application position the normal chamber of the valve 24 is exhausted through the conduit 28 and the passages 70, 71 and 363 of the valve 29 in application position and the conduit 64 and the passage 63 of the valve 39 in application position and thence to exhaust through the conduit 76 and the multiple exhaust conduit 65. The pressure in the conduit 37 forces the valve 34 to application position and with the valve 29 in application position is connected with the conduit 87 through the passage 77 of said valve 29. The conduit 87 is connected with the conduit 80, which leads to the multiple exhaust conduit 81, through the restricted passage 79 of the valve 39 in application position and, since the conduit 37 will thus be connected to exhaust, the relief of pressure therefrom will be so restricted by the passage 79 that it will not be sufficiently reduced to prevent the pressure therein from forcing the valve 34 to application position.

From the above description of the condition of the system following the premature application of the restoring valve 39 it is clear that the premature application of this valve by the operator will not prevent the control system from assuming application position due to the action of the main electrical control valve 1. If the valve 39 were permitted to remain in application position, the valves 24, 29 and 34 would likewise remain in application position regardless of the valve 1. Therefore, the return of the control system to normal position is dependent upon the valve 39 returning to normal position.

In the following description it will be assumed that there has been no premature application of the valve 39. Following the application of the control elements of the control system by the operation of the main electrical control valve to application position there are a series of changes in the control elements of the braking system that occur simultaneously or as a consequence of the initiation of the movement of the valves 24 and 34 by the operation of the main electrical control valve and these changes are broadly changes that result in setting the braking system so that the valve 97 is rendered ineffective for releasing the train and locomotive brakes and so that the valve 168 is so restricted in its normal functioning as to prevent unrestricted release of the locomotive brakes.

The progressive effect upon the control elements of the braking system resulting from the control system assuming application position will now be explained upon the assumption that the automatic brake valve 97 and the independent brake valve 168 remain in normal or running position.

The valves 1 and 29 do not affect the brake operation directly, whereas the valves 24, 34 and 39 are directly concerned with that operation. The valves 24 and 34 are assumed to be in application position, and the valve 39 in normal position in the description that follows.

Simultaneously with the main control valve 24 assuming application position the conduit 319, which is supplied with pressure through the reducing valve, is connected to the conduit 212 of the application cylinder supply connections through the passage 343 in the movable element 25 of the valve 24. Therefore, the reduced pressure from the reducing valve 310 will be delivered to the passage 211 of the equalizing reservoir governor 184 where it will be temporarily shut off by the valve plug 205 closing the port 210, as shown in Fig. 13.

The conduit 183 of the distributing valve release connections is brought out of registration with the conduit 342, as the passage 343 no longer connects the same. Therefore, a release of the distributing valve 270 is prevented, as the movable element 25 of the valve 24 closes the outlet end of the conduit 183 leading from the valve 168. It therefore acts as a safety device because shutting off the conduit 183 also shuts off the outlet from the application cylinder connections including the application chamber 307 of the distributing valve 270.

The independent unrestricted release connections are also broken by reason of the conduit 178 being brought out of registration with the conduit 345 as the passage 346 no longer serves to connect the two. However, the conduit 178 is placed in communication with the conduit 350 of the independent restricted release connections through the groove 355 and the passage 354 in the movable element 25 of the valve 24. Therefore, the release of the distributing valve 270 through the manipulation of the independent brake valve 168 would be restricted to the pressure operating the exhaust safety valve 243 or normally under the assumption of pressures made in the description to approximately 43 pounds.

The above described changes in the condition of the braking system which occur incident to the application of the main control valve 24 are in the nature of an advance setting of the device preparatory to the application of the locomotive brakes through the movement of the distributing valve 270 to the application position. Their function will be further described in connection with the description of the operation of the distributing valve.

The operation of the valve 34 to application position (Fig. 3) results in a brake application on both the locomotive and the train. At the same time changes result in the condition of the braking system and also in the release operations for the valve 97 that render it ineffective for releasing either the locomotive or train brakes when the control system has assumed the application position.

By reference to Fig. 3 it will be noted that the conduit 128 which is in communication through its connection with the chamber 103 above the equalizing piston 99 in the automatic brake valve 97 is no longer connected with the passage 336 which communicates through the passage 337 with the conduit 133 which communicates with the chamber 104 below the equalizing piston 99. Said passages 336 and 337 also are in communication with the conduit 338 which connects into the extension conduit 339 leading to the train brake system and also into the extension conduit 290 leading to the distributing valve 270.

It will be remembered that in the normal position of the control system the pressure in the brake pipes 338, 339 and 290 and below the equalizing piston 99 is equal to the pressure above the equalizing piston 99 and in the equalizing reservoir 129, that is to say, approximately 70 pounds. However, in application position the pressure above and below the equalizing piston 99 is broken as it is shut off by the movable member 35 of the valve 34 which disconnects the conduit 128 from the conduits 133 and 338. After the pressure has been shut off in the conduit 128 the pressure in the chamber 103 above the equalizing position 99 is reduced a sufficient amount to permit the operation of the locomotive and train brakes by reducing the pressure in the chamber 104 below the equalizing piston 99 and consequently in the brake pipe or train line. A reduction of the pressure in the chamber 103 is accomplished in the following manner.

It will be remembered that the chamber 103 is connected by the passage 130 and the conduit 131 with the equalizing reservoir 129, the other end of which is connected by the conduit 197 into the passage 196 of the equalizing reservoir governor (Fig. 13). The passage 196 maintains pressure in the chamber 188 in the normal condition of the braking system against the piston 186. It will also be remembered that the chamber 188 is closed so that there will be no reduction of pressure therein while the control system is in normal position, because the conduit 201, which is connected with said chamber 188 through the connections including the port 190 and the passages 198 and 200 is closed by the movable member 35 of the valve 34 in normal position.

However, when the valve 34 is moved to application position (Fig. 3) the conduit 201 connects with the passage 357, which passage 357 has the groove 358 at its outlet end. The groove 358 registers with the conduit 153 which connects into the housing of the preliminary exhaust valve (Fig. 10). The pressure in the conduit 153 functions to raise the flap valve 154 moving the valve from its seat 159 and seating the upper face of the valve against the seat 160. This action closes the chamber 152, except for the inlet and the exhaust thereof through the preliminary exhaust port 167. When the valve raises the bracket 165 the bifurcated arm 166 is caused to engage the shoulder of the element 163 with its attached stem 164 and thus prevent the stem 164 from following the equalizing piston stem 107 when the equalizing piston 99 is raised.

The pressure delivered by the conduit 153 to the chamber 152 as already described will exhaust to atmosphere through the port 167. This exhaust is a retarded exhaust and has the effect of slowly reducing the pressure in the chambers 199 and 188 of the equalizing reservoir governor 184, in the equalizing reservoir 129 and in the chamber 103 above the equalizing piston 99.

It will be remembered that the pressure below the equalizing piston 99 and the pressure above said piston was equalized in the normal position of the control system but that the two chambers are out of communication when the valve 34 assumes application position. It follows, therefore, that during the interval that the pressure in the chamber 103 is being reduced the excess pressure in the chamber 104 will tend to raise the equalizing piston 99. The equalizing piston 99 is thereby forced upwardly which moves the stem 107 upwardly, as there is a loose connection between the stem 107 and the equalizing piston 99. The connection between the two is such that, in moving upwardly, the piston carries the stem with it but there is a relative movement between the two when the piston is depressed. When the stem 107 is thus raised the pressure from the chamber 104 passes through the ports 110 and 113 into the chamber 149 of the valve 112 from whence it exhausts to atmosphere through the port 150. As the pressure is reduced in the chamber 104 there follows a reduction in pressure in the conduit 133 which is connected with said chamber 104 through the passages 132 and 134.

Simultaneously with the reduction of pressure in the conduit 133 the pressure in the brake pipe 338 is reduced as well as in the conduits 339 and 290. Inasmuch as the conduit 339 is connected with the train brake system and the conduit 290 is connected with the equalizing portion of the distributing valve 270 which controls the locomotive brakes, the reduction of pressure in the conduit 133 in the manner hereinbefore described results in an application of the train brakes and locomotive brakes and, in the case of a lone locomotive, of the locomotive brakes only. The application of the locomotive brakes through the reduction of pressure in the conduit 290 results from the following operation of the distributing valve 270 (Fig. 23):

As the brake pipe 290 is connected into the equalizing piston chamber 286 any reduction in the conduit 290 would also cause a reduction in the chamber 286. This reduction in the chamber 286 is followed by the movement of the equalizing piston 287 because the pressure on the opposite side of the piston is now greater than that in the chamber 286. The movement of the piston first closes the feed groove 291, thus preventing the escape of pressure from the equalizing slide valve chamber 292 or from the pressure chamber 294 with which it is connected. This results in an excess pressure on the opposite side of the piston which moves it to the right (Fig. 23) carrying with it the graduating valve 288. This results in opening the passage 298 in the equalizing slide valve 289.

The piston continues in its movement toward the constantly lowering pressure in the chamber 286. The movement of the piston also moves the equalizing slide valve 289 which results in bringing the passages 298 and 301 of the valve 289 into registration with two of the outlet openings of the passage 303 in the valve body. The passage 301 in the valve 289 registers with the passage 302 in the valve 289 through the passage 297 of the valve 288, thus connecting the passage 303 with the safety valve 309 through the passage 308. The passage 303 is also connected with the passage 306 leading to the application chamber 307, the passage 300 in the valve 289 forming the connection.

Through the connections described the initial pressure of 70 pounds stored in the pressure chamber 294 now expands into the safety valve 309; into the application chamber 307; into the application cylinder 271; and into the application cylinder connections. Pressure cannot escape from these devices and connections because the passage 299 in the valve 289 no longer connects the passages 303 and 306 with the passage 305 leading to the distributing valve release connections, even though there may be a leak in the valve 289 which would tend to release the pressure as the valve 24 in application position closes the conduit 183 of the distributing valve release connections. Therefore, regardless of whether the distributing valve operates normally or not, the pressure that builds up to apply the locomotive brakes will be positively shut off.

The application of the locomotive brakes is accomplished in the following manner:

The admission of pressure to the application cylinder 271 forces the application piston 272 to the right. The first movement of the piston closes the exhaust valve 275, thus breaking communication between the chamber 274 and exhaust through the passage 285. As the piston continues its movement the application valve 278 is moved toward the right opening of the passage 279 and thus admitting main reservoir pressure to the chamber 274 from the chamber 280. The chamber 280 is constantly supplied with main reservoir pressure from the conduit 282 through the passage 281. The admission of pressure to the chamber 274 is followed by admitting pressure to the conduit 284 due to the fact that the passage 283 connects the two. Since the conduit 284 is connected with the brake cylinders of the locomotive and tender, the locomotive brakes will be applied. The admission of main reservoir pressure to the chamber 274 and the conduit 284 through the application valve 278 will continue so long as the pressure which expands from the pressure chamber 294 into the application cylinder 271 on the left of the piston 272 is greater than that in the chamber 274 and the conduit 284. However, when the pressure in the chamber 274 and the conduit 284 approximates or slightly exceeds the application cylinder pressure, the piston 272 will operate to close the application valve 278 and thereby prevent the further admission of pressure to the brake cylinders.

Simultaneously with the admission of pressure to the application cylinder 271 from the pressure chamber 294, the chambers 218 and 237 of the locomotive brake governor 214 (Figs. 15 and 20) are also supplied with pressure through the application cylinder connections.

It will be remembered that in the normal or running position of the braking system the chambers 218 and 237 are free from pressure and that the spring 221 is adjusted to withstand a predetermined pressure, for example, approximately 40 pounds. Therefore, as there is no pressure beneath the piston 216 in normal or running position, the pin valve 219 is held to its seat by the tension of the spring 221, thus closing the port 220 which connects the chamber 218 with the passage 228. However, when the pressure which is supplied to the chamber 218 exceeds the tension of the spring 221, for example, 40 pounds, the piston 216 will be raised and the pin valve 219 thereby raised, thus connecting the chamber 218 with the passage 228, as shown in Fig. 20.

In reference to the chamber 237 it will be remembered that in normal or running position of the braking system said chamber is connected with the application cylinder supply connections through the port 240 so long as the valve plug 235 is raised from its seat, as shown in Fig. 15. Therefore, the pressure building up in the chamber 237 will expand into the application cylinder supply connections and consequently through the conduit 209 into the chamber 207 of the equalizing reservoir governor 184 in which it is trapped by the valve plug 205 seated on its seat 210, as shown in Fig. 13.

The pressure building up in the chamber 237 continues to expand into the chamber 207 until the pin valve 219 is raised from its seat. This connects the chamber 218 with the passage 228, thereby supplying the chamber 229 above the piston 232 with the predetermined pressure, for example, 40 pounds. Therefore, the piston 232 with its attached valve stem 234 and the valve plug 235 will be forced downwardly against the tension of the spring 233, as shown in Fig. 20. When the valve plug 235 finds its seat the port 240 will be closed, thus breaking communication between the chamber 237 and the application cylinder supply connections.

From the above description it will be apparent that approximately 40 pounds of pressure will be trapped in the application cylinder supply connections between the chamber 207 of the governor 184 and the passage 241 of the governor 214.

With the admission of 40 pounds pressure to the passage 228 and to the chamber 229, the locomotive brake governor control valve 257 is likewise supplied with pressure from the pressure chamber of the distributing valve through the application cylinder connections. This pressure expands through the passage 230 of the governor 214 and through the conduit 231 to the passage 260 of the locomotive brake governor control valve 257 (Figs. 17 and 22). It will be remembered that in the normal or running position of the braking system the chamber 229 of the governor 214 is free from pressure due to the fact that the passage 260 is connected with exhaust so long as the locomotive brake governor control valve 257 is in normal or open position, as shown in Fig. 17.

It will also be remembered that this connection with exhaust is made through a restricted exhaust passage 263 in the valve 259. However, when the pressure in the chamber 218 of the governor 214 is sufficient to open the pin valve 219 against the tension of the spring 221, as hereinbefore described, the pressure admitted to the chamber 229 will increase to such a degree that it cannot exhaust through the restricted exhaust passage 263 to a sufficient degree to prevent the valve 259 from raising against the tension of the spring 261.

It will be remembered that the spring 261 is adjusted to withstand, under the assumptions of pressures made, a pressure of approximately 42 pounds. Therefore, when the pressure supplied by the pressure chamber 294 of the distributing valve has reached 42 pounds the valve 259 will be forced upwardly. The control valve 257 will then assume application or closed position, as shown in Fig. 22, from which it will be noted that the exhaust passage 265 is closed, completely closing the conduit 231 and causing the pressure to be maintained in the chamber 229 at the pressure to which it has been built up, thereby holding the valve plug 235 closed.

Pressure is supplied from the pressure chamber 294 of the distributing valve through the action of the equalizing slide valve 289 while the pressure is reducing in the brake pipe 290 and the equalizing piston chamber 286.

It will be remembered that the pressure in the brake pipe 290 is reduced to cause a brake application. As a result of this the pressure of 70 pounds originally stored in the pressure chamber 294 is reduced to approximately 50 pounds, due to the expansion of the pressure into the application cylinder connections, into the application cylinder 271 and the application chamber 307. Therefore, the application cylinder 271 of the distributing valve, the chambers 218, 229 and 237 of the locomotive brake governor, and the passage 260 of the locomotive brake governor control valve will be supplied with pressure of approximately 50 pounds, whenever a full locomotive brake application is accomplished.

Following this brake application there is a change of condition in the equalizating portion of the distributing valve due to the stabilization of the pressure remaining in the conduit 290. It will be remembered that the pressure delivered by the conduit 153 starts to exhaust to atmosphere through the port 167 which has the effect of slowly reducing the pressure in the chambers 199 and 188 of the equalizing reservoir governor 184, in the equalizing reservoir 129, and in the chamber 103 above the equalizing piston 99. When the pressure in the conduit 153 is reduced to the pressure in which the piston 186 of the equalizing reservoir governor 184 lowers due to the tension of the spring 191, or approximately 50 pounds, the spring 191 will function to force the piston downwardly and thereby force the pin valve 189 against its seat 190, as shown in Fig. 18.

After the port 190 has closed, the pressure in the conduit 153 will continue to exhaust through the port 167 until the pressure in the conduit 153 has exhausted sufficiently to permit the flap valve 154 to return to its normal or depressed position. The effect of this action will be described at a later point in the specification.

The result of the closing of the port 190 is that the pressure in the conduit 197 reduces to the pressure at which the piston operates and will then remain stationary at the predetermined pressure of approximately 50 pounds. As the conduit 197 is connected with the equalizing reservoir 129 which, in turn, is connected with the chamber 103 above the equalizing piston 99, it is evident that the pressure in these connections will also remain stationary at 50 pounds. Therefore, when the pressure in the chamber 104 has reduced to a point slightly less than the pressure above the piston 99 the piston will be forced downwardly gradually which causes the stem 107 to seat, thus preventing the further reduction of pressure in the chamber 104 by the closing of the ports 110. As the chamber 104 is connected to the brake pipe 338 which branches into the brake pipe 339 leading to the train brake system and to the brake pipe 290 leading to the distributing valve through the connections previously described, it is obvious that by the closing of the ports 110 a stabilization of the pressure in the brake pipe at 50 pounds is accomplished. The train brakes are thus fully applied as are those of the locomotive due to this reduction in pressure.

As a result of the stabilization of the pressure in the conduit 290 the pressure in the pressure chamber 294 of the distributing valve is no longer supplied to the application cylinder connections, which include the application cylinder 271 of the distributing valve, the chambers 218, 229 and 237 of the locomotive brake governor and the passage 260 of the locomotive brake governor control valve. This result is effected by the action of the equalizing piston 287. When the pressure in the equalizing slide valve chamber 292 and the pressure in the chamber 294 with which it is connected reduces to a degree slightly less than the pressure in the chamber 286 on the opposite side of the piston 287 it will be moved slightly towards the left carrying with it the graduating valve 288. However, the equalizing slide valve 289 is not moved. The movement of the graduating valve 288 closes the passage 298, thus discontinuing communication between the pressure chamber 294 and the application cylinder connections. At the same time the passage 297 of the valve 288 disconnects the application cylinder connections from the safety valve 309, since the passages 301 and 302 of the equalizing slide valve are no longer in communication. The safety valve 309 does not function under any of the conditions hereinbefore described, but is provided to insure that the application cylinder 271 will not be supplied with excess pressure during an application of the distributing valve. This application is accomplished in the manner above described.

Cutting off the connection of the safety valve, therefore, insures that the locomotive brakes remain applied even though the safety valve may leak or improperly operate. Therefore, the application cylinder connections are supplied with pressure of approximately 50 pounds which also supplies the brake cylinders of the locomotive and tender with the same pressure.

It is therefore obvious that any reduction in the brake pipe pressure will be approximately in coordination with the reduction of pressure in the distributing valve pressure chamber 294 and through the connections described this reduction is approximated by supplying pressure of the same degree to the brake cylinders to bring about a brake application.

It will be remembered that after the port 190 of the equalizing reservoir governor 184 is closed the pressure in the conduit 153 will continue to exhaust through the port 167 of the preliminary exhaust valve 112 until the pressure is exhausted sufficiently to permit the flap valve 154 to return to its normal or depressed position. As the conduit 153 is connected with the chamber 199 of the governor 184 the preliminary exhaust valve 112 will also act as a control for the chamber 199 as well as a control for the chamber 188 as hereinbefore described.

It will be remembered that the pin valve 189 has closed, thereby breaking the connection between the chamber 188 and the conduit 153.

Reduction in pressure in the conduit 201 is followed by a similar reduction of pressure in the chamber 199 so that when the pressure in the chamber 199 is reduced sufficiently to permit the spring 203 to raise the piston 202 the valve plug 205 will be raised from its seat 210 and the pressure in the conduit 212 from the valve 24 will expand through the passage 208 of the governor 184 and into the passage 241 of the governor 214 where it is shut off by the valve plug 235.

It will be remembered that the conduit 209 was supplied with a pressure of 40 pounds before the governor 214 acted to close the valve plug 235 as shown in Fig. 20. As the conduit 212 is supplied with reducing valve pressure or approximately 45 pounds when the main control valve 24 assumes the application position it is evident that the application cylinder supply connections under the condition being described will be supplied with the same pressure, as they are shut off at their outlet ends by the valve plug 235 as long as the application cylinder connections supply the chambers 218 and 229 of the governor 214 and the passage 260 of the control valve 257 to approximately 42 pounds pressure.

The purpose of the governors 184 and 214 and the control valve 257 is to control the supplemental pressure supplied by the application cylinder supply connections to the application cylinder connections in the event the normal minimum predetermined pressure in the application portion of the distributing valve 270 reduces below a predetermined limit, as will now be described.

Under the normal operating conditions of the system in its application position the application cylinder supply connections do not function to supply the application cylinder of the distributing valve with pressure through the application cylinder connections. However, in the event the pin valve 219 of the governor 214 seats, due to the reduction of pressure in the application cylinder connections below the tension of the spring 221, which under the assumption of pressure made is approximately 40 pounds, the tension of the spring 261 of the control valve 257 being set at approximately 42 pounds, would force the valve 259 to its seat, thus opening the restricted passage 263 to atmosphere, as shown in Fig. 17. As the control valve 257 acts as a control for the chamber 229 of the governor 214 it follows that when the pressure in said chamber 229 has reduced sufficiently, the piston 232 will raise the valve plug 235 from its seat, thus opening the port 240 and the pressure in the application cylinder supply connections will thus expand into the application cylinder connections and rebuild the pressure in the application cylinder of the distributing valve for the purpose of applying the locomotive brakes. When the pressure has been built up in the application cylinder to the degree determined by the setting of the control valve 257, that is to say, approximately 42 pounds, the pin valve 219 will again open and the supply of pressure from the application cylinder supply connections will be discontinued by the valve plug 235 again closing.

This operation will only occur in the event of the pressure in the passage 260 of the control valve 257 or the pressure in the chamber 218 of the governor 214 reducing for any reason, such, for example, as leaks in the system or the operation of the other control devices tending to release pressure in the application cylinder connections. This construction, therefore, affords a safety device that insures, under any condition when the application of the brakes is intended, that there will be a sufficient predetermined pressure in the application cylinder of the distributing valve to apply the locomotive brakes irrespective of whether the train brakes apply or not or whether they remain applied after an application due to leaks or other causes.

The restrictions that are imposed on the valve 97 in its normal release operations upon the valve 34 assuming application position will now be described.

It will be remembered that upon the application of the valve 24 the distributing valve release connections are broken by reason of the conduit 183 being out of registration with the conduit 342. The conduit 342 is closed off by the movable member 35 of the valve 34 (Fig. 3) and therefore is no longer in communication with the conduit 138 as the passage 344 no longer connects the two. An additional safety factor is therefore provided because closing off the conduit 342 insures that, regardless of whether the distributing valve operates normally in moving to application position, the pressure will be positively shut off permitting the application cylinder pressure to build up to apply the locomotive brakes. The control of the conduit 342 also acts as a safety device when the control system goes from the application to the normal position.

A manual manipulation of the valve 97 shown in Fig. 10 to the holding position results in closing the passage 137. However, in certain adjustments of the valve the plug 144 in the passage 143 is removed and a passage (not shown) through the rotary valve 98 thus connects the passage 137 with the exhaust passage 141. Regardless of the adjustment of the valve 97 the movement of the valve 24 or 34 to application position prevents a release of the distributing valve through the distributing valve release connections. A manual manipulation of the valve 97 to the lap position results in closing the passage 137. However, in certain adjustments of the valve a passage (not shown) through the rotary valve 98 connects said passage 137 with the passage 145, said passages acting as an exhaust when the plug 146 is removed. Regardless therefore, of the adjustment of the valve 97 the movements of the valve 24 or 34 to application position prevents a release of the distributing valve through the distributing valve release connections.

In the foregoing description of the control of the elements of the control system when moving to application position the valve 97 has been considered as being in the normal or running position, as shown in Fig. 10, which, in fact, is a release position, as the braking system is supplied with feed valve pressure to compensate for any leakage in the braking system and at the same time to maintain a predetermined pressure in the chamber 103 and in the equalizing reservoir 129 equal to the pressure in the chamber 104 and to the pressure in the brake pipes 338, 339 and 290.

In order to prevent the maintenance of this equal pressure in the connections described which would result in the stabilizing of the braking system, it is necessary to prevent the stabilization of pressure through the valve 97 by closing off the connection between the conduit 326 that supplies feed valve pressure and the conduit 121. By reference to Fig. 3 it will be noted that the movable element 35 of the valve 34 closes off the feed valve conduit 326 and thus, since the reduction of pressure in the conduits 121 and 128 through their connection with the chamber 103 cannot in this adjustment be replaced, the reduction in pressure in the chamber 103 and the equalizing reservoir 129 will be accomplished in the manner hereinbefore described, thereby insuring a brake application.

A manual manipulation of the valve 97 to holding position results in feed valve pressure being supplied to the braking system through the same passages as when the valve is in running position and the same restrictions are in this manner placed on the valve 97 in holding position and therefore a brake application is likewise insured.

It will be remembered that in normal condition main reservoir pressure is admitted to the chamber 116 of the valve 97. This condition changes when the valve 34 assumes application position, as the conduit 56 which supplies main reservoir pressure to the chamber 116 when the valve 34 is in the normal position, upon the valve assuming application position, connects with the conduit 96 through the passage 329 and communication between the conduits 56 and 330 through said passage 329 no longer exists.

When the supply of main reservoir pressure to the chamber 116 is closed off by the operation of the valve just described the chamber 116 is simultaneously connected with the train control feed valve pressure of approximately 49 pounds, which is delivered to said chamber through the conduit 323, said conduit 323 being connected with the conduit 330 through a passage 365 and a branch passage 366 in the movable member 35 of the valve 34. The pressure that is trapped in the conduit 330 by reason of its previous connection with the main reservoir pressure exhausts through the branch passage 366 and the passage 365 which connects with the conduit 360, said conduit 360 connecting with the train control feed valve safety valve 314. The valve 314 exhausts to atmosphere when pressure is delivered thereto in excess of the set tension of its regulating spring which it will be remembered is set at approximately 50 pounds pressure. As the pressure from the main reservoir trapped in the conduit 330 is in excess of the pressure that is admitted from the conduit 323 the release through the train control feed valve safety valve 314 will continue until the actual pressure is equalized with the pressure admitted through the conduit 323 which results in the reduction of the pressure below the check valve 313 into which the conduit 330 connects. As the safety valve 314 is set for approximately 50 pounds pressure which is slightly in excess of the pressure supplied from the train control feed valve 311, that is to say, 49 pounds, it follows that a predetermined pressure slightly below the set pressure of the safety valve will be maintained below the check valve 313.

The conduit 115 above the check valve 313 connects with the chamber 116 and, as the check valve 313 acts as a back pressure valve reversely to the flow of pressure through the conduits 330 and 115, the check valve will be closed and the chamber 116 will maintain the pressure previously supplied from the main reservoir as long as the valve 97 remains in normal or running position. The trapped pressure in the chamber 116 is assured because the conduit 119 is closed by the movable member 35 of the valve 34.

The purpose of constantly maintaining the pressure of 49 pounds in the conduit 330 against the lower portion of the check valve 313 when the valve 34 is in application position is to insure that there will be available in the event of leakage of the trapped pressure in the chamber 116 a sufficient pressure to insure a seating of the rotary valve 98. In the event of the reduction of pressure through leakage in the chamber 116 to balance the pressure in the train control feed valve 311 the check valve 313 opens and supplies the predetermined pressure of 49 pounds which is sufficient to hold the rotary valve 98 to its seat. This is a safety provision because, if the rotary valve unseats, control over the passages in the valve body by the rotary element would be prevented. It will be noted that the adjustment of the valve 311 is such that the pressure admitted to the conduit 323 and thereby through the connections described to the chamber 116 is sufficiently low to prevent a release of the locomotive and train brakes in the event the valve 97 is manipulated to release and recharging position.

A manual manipulation of the valve 97 to a release and recharging position results in connecting the passages 123 and 126 with the chamber 116 through passages (not shown) in the rotary valve 98. As the passage 123 and the passage 127 connected thereto are in communication with the conduit 128 which is out of communication with the brake pipe and the lower side of the equalizing piston 99 by the movable member 35 of the valve 34, and as the passage 126 is connected with the chamber 103 above the equalizing piston 99, which chamber 103 has a retarded release to atmosphere through the preliminary exhaust valve 112, as above described, it is evident that a manipulation of the valve 97 to the release and recharging position will not prevent an application of the locomotive and train brakes nor will it permit releasing them after the control system has effected a brake application. The general effect of the manipulation of the valve 97 to release and recharging position during the time that the pressure reduces in the chamber 103 above the equalizing piston 99 is to supply the chamber 103 with the excess pressure trapped in the chamber 116 and to provide additional volume necessary to accomplish a delayed application of the locomotive and train brakes. However, this pressure will reduce to the balanced setting of the equalizing reservoir governor 184, or 50 pounds. However, due to the excess pressure temporarily supplied, the general effect will be to delay the application of the locomotive and train brakes for a slight interval which is desirable in certain conditions of the train operation.

It will be noted, however, that the system is so constructed as to preclude the possibility of a release of the brakes when an application is intended through the action of the control system in application position. In the release and recharging position of the valve 97 the passage 120 is connected with the passage 142 and with the exhaust passage 141 through a passage (not shown) in the rotary valve 98. The effect of this manipulation of the valve 97 is therefore to exhaust the feed valve pressure trapped in the conduit 121 by the movement of the valve 34 to application position. This action has no effect on the braking system but is a condition that operates as a warning to the operator to indicate the position of the brake valve when the control system is in normal position and also that the manipulation of the brake valve is not restricted.

A manual manipulation of the valve 97 to the service position results in connecting the passage 147 with the passage 140 leading to the exhaust passage 141, said two passages being connected by a passage (not shown) through the rotary valve 98. As the passage 147 leads from the chamber 103 above the equalizing piston 99 it is evident that with the valve in service position a reduction of pressure in the chamber 103 will cause a brake application in the same manner as the valve 34 in application position. However, there is a coordination between the movement of the equalizing piston 99 and the preliminary exhaust valve 112 dependent upon the time the valve 97 is placed in service position with respect to the movement of the valve 34.

Upon the valve 34 assuming application position a reduction of pressure in the chamber 103 and in the equalizing reservoir 129 and the chambers 188 and 199 of the governor 184 is initiated by the preliminary exhaust valve 112. It will be remembered that when the flap valve 154 raises, the bracket 165 and the bifurcated arm 166 are caused to engage the shoulder of the element 163 with the attached stem 164, thus preventing the stem 164 from following the equalizing piston stem 107 when the equalizing piston 99 is raised. This is the action when the valve 97 is in normal or running position. If, however, the valve 97 is placed in service position prior to the application of the valve 34, which setting of the valve 34 is followed by the application of the preliminary exhaust valve 112, as above described, the equalizing piston 99 will raise carrying with it the equalizing piston stem 107, and thus reducing the brake pipe pressure in the normal way to effect an application of the locomotive and train brakes. As the bifurcated arm 166 is free from the shoulder 163 and its attached stem 164 when the conduit 153 is free from pressure due to the flap valve 154 being in a normal or closed position it is evident that the spring 162 will cause the stem 164 to follow the stem 107 as it is raised, thereby causing the element 163 to enter the bifurcated extremity 166 which holds the bracket 165 in its normal position.

The valve 154 will thus be held to its seat 159 and therefore should pressure be delivered to the conduit 153 by the application of the valve 34 the flap valve 154 will be prevented from raising. Under these conditions the only exhaust from the chamber 103 is through the passage 147. When this exhaust occurs a brake application ensues in the same manner as if the exhaust was brought about through the control system. The purpose of this construction is to prevent an excessively rapid reduction of pressure in the chamber 199 of the governor 184 which would have the effect of cutting the application cylinder supply connections into service prematurely, as the piston 202 and the valve plug 205 would raise, as hereinbefore described. The construction therefore affords a safety provision that prevents the application of the locomotive brakes prior to the application of the train brakes. It will be understood, however, that the application cylinder supply connections operate as soon as the reduction in pressure in the chamber 103 is discontinued where this reduction is brought about by the manipulation of the valve 97 to any other position than the service position of said valve 97, since the stem 107 will be forced downwardly, thus forcing the stem 164 and the element 163 downwardly, thereby freeing the bracket 165 and the bifurcated arm 166 from the element 163. The flap valve would thus be raised from its seat 159 and reduce the pressure in the chamber 199 in the manner hereinbefore described, causing the valve plug 205 to open the application cylinder supply connections.

A manual manipulation of the valve 97 to service position after the preliminary exhaust valve 112 has initiated a brake application will have the effect of causing a rapid reduction in the chambers 188 and 199 of the governor 184, but as the whistle 54 is caused to sound an audible signal upon the application of the valve 34 the operator will be informed of the condition of the control system and therefore can govern the manipulation of the valve 97 to suit the circumstances.

Another safety feature is provided in the present construction in that, should a service application of the brakes through a manual manipulation of the valve 97 to service position not balance the setting of the governor 184, that is to say, not reduce to a pressure of 50 pounds, the preliminary exhaust valve 112 will operate to reduce the pressure in the chamber 103 and the brake pipe to the required degree, in the event a service reduction is discontinued by the operator before the required reduction of 20 pounds.

It will be remembered that in the normal position of the control system and with the valve 97 in the normal or running position the conduit 119 supplies the conduit 332 leading to the low pressure head 333 of the governor 316 with main reservoir pressure from the chamber 116. The operation of the pump is therefore controlled in the usual way by the manipulation of the valve 97. However, upon the valve 34 assuming the application position the conduit 119 from the chamber 116 is closed by the movable member 35 and said passage 119 no longer is in registration with the conduit 332.

At the same time that the conduit 119 is closed the conduit 332 is brought into registration with the manifold exhaust conduit 81 through a passage 367 in the movable member 35 of the valve 34. The registration of the conduit 332 with the manifold exhaust conduit 81 releases the pressure in the low pressure head 333 of the governor 316. The low pressure head no longer controls the valve 334 and, as the pressure drops below the predetermined minimum of 90 pounds through the connections described, the control of the pressure in the main reservoir will come under the control of the high pressure head 328. As the high pressure head is set at approximately 110 pounds the pump will build up the pressure in the main reservoir to the setting of the high pressure head because the conduit 327 connects the main reservoir 55 with the high pressure head 328. The operation of the pump will continue until the high pressure head 328 operates to close the valve 334 when the operation of the pump will be stopped. This operation is an important operation that is automatically controlled by the application of the control system. It provides an excess of main reservoir pressure to supply the demand for the additional structure associated with the train control device and at the same time provides a sufficiently high excess pressure available for use for a quick release and recharge of the brake pipe and distributing valve when the control system returns to normal position.

It will be remembered that upon the application of the valve 24 the independent unrestricted release connections are broken by reason of the conduit 178 being out of registration with the conduit 345 as the passage 346 no longer connects the two. However, upon the valve 34 assuming the application position the independent unrestricted release connections are placed in communication with the conduit 247 leading to the restricted exhaust safety valve 243 as the conduit 347 registers with the conduit 247 through the passage 348 in the movable member 35 of the valve 34. As these connections provide a control for the independent brake valve 168 when the control system returns to the normal position they will be described in detail hereinafter.

The restrictions that are imposed on the valve 168 in its normal release operations when the valve 24 assumes the application position will now be described.

A manual manipulation of the valve 168, shown in Fig. 12, to a release position results in connecting the conduit 176 of the application cylinder connections with the conduit 178 which is in communication with the independent restricted release connections. A passage (not shown) in the rotary valve 169 connects the passages 175 and 177 in the body of the valve.

As the independent restricted release connections lead to the restricted exhaust safety valve 243 (Figs. 16 and 21) it follows that by setting the valve 243 to exhaust at a predetermined pressure the pressure in the conduit 176 and the pressure in the application cylinder connections cannot be reduced below this predetermined pressure. The spring 248 of the valve 243 is adjusted, as has been described, to withstand a pressure of 43 pounds. Therefore, when the valve 168 is manipulated to release position it releases the pressure in the application cylinder connections to the point determined by the valve 243. As the application cylinder connections are supplied with a pressure of approximately 50 pounds from the pressure chamber of the distributing valve it is evident that this pressure delivered by the conduit 247 to the passage 246 of the valve 243 will be greater than the spring tension of the spring 248 and the valve 245 will therefore be raised from its seat, as shown in Fig. 21, and the excess pressure will exhaust through the chamber 250 and the passage 251. When the pressure below the valve 245 has reduced approximately to the tension of the spring 248 the valve 245 is forced slightly downwardly, thus restricting the area of the passage 251 and opening the passage 252 to the chamber 253 above said valve 245.

The chamber 253 is also connected with exhaust through the passages 254 but the pressure exhausted accumulates in the chamber 253 more rapidly than it can escape and therefore it assists the spring 248 in closing the valve 245 when the pressure is reduced to the setting of the valve. Therefore, no further reduction is possible and a pressure of 43 pounds will remain in the connections described. This permits the operator to effect a partial release of the pressure in the application cylinder of the distributing valve and therefore a restricted release of the brakes on the locomotive independent of the train brakes. This is an important operation because, after the locomotive and train brakes have been applied through the operation of the main electrical control valve it frequently becomes necessary in the operation of the train to partially release the locomotive brakes to avoid sliding wheels, overheating of the driver tires, or other operative conditions. It is necessary as a safety factor to limit the release of the locomotive brakes as long as the application condition of the control system remains. The construction just described permits this necessary partial release of the brakes on the locomotive, but at the same time does not interfere with the application of the brakes on the train.

Another important reason for restricting the release of the locomotive brakes is that when a locomotive is operating detached from a train, after the main electrical control valve has assumed application position the operator is prevented from reducing the pressure beyond the predetermined setting of the valve 243. As this valve may be set at any desired exhaust pressure the conditions can be so controlled that the operator can, by manipulation of the valve 168, effect a partial release of the lone locomotive brakes, but he will not be able to operate the locomotive at normal speed. The adjustment may be such that after the main electrical control valve is operated to application position the locomotive will be brought to a stop, regardless of an attempt to release the brakes of the locomotive by the operator.

When the valve 168 is in release position, a passage (not shown) in the rotary valve 169 connects the chamber 173 with the passage 174 in the body of said valve, which passage 174 leads to atmosphere. Thus, reducing valve pressure to a limited degree is discharged and serves as a warning to the operator of the position of the valve.

Another feature in the operation of the system is the coordination between the safety valve 243 and the control of the application cylinder supply connections by the locomotive brake governor 214 and the locomotive brake governor control valve 257. In the description above given of the safety valve 243 it was considered as set at 43 pounds, the governor 214 at 40 pounds and the control valve 257 at 42 pounds. Under this adjustment of the controls the application cylinder of the distributing valve can be reduced to 43 pounds minimum, the regulation for the reduction being provided by the safety valve 243. However, in the event that pressure in the application cylinder falls below this amount due to leaks or other causes such as failure of the safety valve 243 to close, the control valve 257 and the governor 214 will operate in the manner hereinbefore described to supply the application cylinder connections with 45 pounds pressure from the application cylinder supply connections. This supply of pressure will continue as long as the valve 168 is held in release position and will have the general effect of slowly building up the pressure in the application cylinder of the distributing valve until such pressure would be sufficiently high to again operate the governor 214 and the control valve 257 when the application cylinder supply connections will again be closed. This restored pressure in the application cylinder of the distributing valve is alternately reduced and restored, thereby causing an intermediate application of the brakes.

By setting the safety valve 243 to withstand a pressure of approximately 50 pounds, it is possible to cut the restricted release features out of service, if desired. Under these conditions the pressure of approximately 50 pounds developed in the application cylinder of the distributing valve through a brake pipe reduction and the action of the equalizing slide valve, as hereinbefore explained, will be retained in the application cylinder, thereby causing a full brake application of the locomotive brakes. Under these conditions the governor 214 will be set at 44 pounds and the control valve 257 at 45 pounds. This provides a safety feature that insures the application of the locomotive brakes. In the event the application cylinder pressure, for any reasons, becomes lowered to the balanced setting of the control valve, then the application cylinder connections will again supply the application cylinder with a maximum pressure of 45 pounds until such time as the governor 214 and the control valve 257 operates to discontinue the supply of pressure as the pressure is retained in the application cylinder for the purpose of applying the locomotive brakes.

The effect of a premature manual manipulation of the restoring valve 39 to application position will now be explained in its relation to the braking system when the main electrical control valve has operated to cause the control system to assume the application position. The conduit 345 of the independent unrestricted release connections is closed by the movable member 41 of the valve 39 in application position (Fig. 7) and therefore, regardless of the position of the other control elements, a release of the distributing valve 270 is impossible through these connections. The conduit 350 of the independent restricted release connections is also closed by the movable member 41 of the valve 39 in application position and therefore in the event the operator desires to take advantage of the restricted release features for the purpose of partially releasing the locomotive brakes it is necessary for the operator to permit the valve 39 to return to its normal position (Fig. 6) before such operation could be accomplished. As has been hereinbefore explained, if the valve 39 is permitted to remain in the application position, the valves 24, 29 and 34 will likewise remain in application position, regardless of the position of the valve 1.

In the description above given it will be recalled that the train of operations has been assumed to follow upon the operation of the main electrical control valve 1 following an unsafe track condition. It will also be recalled that the return of the control system to normal position is dependent upon the valve 39 being first returned to normal position.

The following description of the return of the control elements of the control system to their normal position will therefore consider the valve 39 in its normal position until such time as it is properly manipulated to application position in effecting return of the control system to normal position.

In order clearly to disclose the operation of the control elements of the control system when returning to normal position following the change of condition of the main electrical control valve due to a safe condition of the track the progressive effect upon the control system following such return of the valve 1 to normal position will be explained.

The first control to assume the normal position is the main electrical control valve 1. It will, of course, be understood that the main electrical control valve remains in the application position until the track condition is clear. When the track condition is clear the main electrical control valve is restored to normal by re-establishing the circuit to energize the electrical field 2 which restores the armature 5 to the position shown in Fig. 14. When the armature 5 is raised the valves 11, 12, 9 and 10 are operated. Communication is thus established between the passages 15 and 18 and at the same time the chamber 19 is cut out of communication with the passage 20. Communication is also established between the passage 21, the chamber 22 and the passage 20.

Since the conduit 60 carries main reservoir pressure this pressure passes through the valve by way of the passage 15, the chamber 16 and the passage 18 and enters the conduit 62. The conduit 62 connects with the conduit 64 through the passage 63 in the movable member 41 of the valve 39 in its normal position (Fig. 6). The pressure in the conduit 64 passes through the valve 29 in the application position (Fig. 9) by way of the passages 363, 71 and 70 and thence through the conduit 28 to the normal chamber of the valve 24.

The pressure in the application chamber of the valve 24 is exhausted through the conduit 27, thence through the passage 21, the chamber 22 and the passage 20 of the valve 1 to the multiple exhaust conduit 65. The conduit 67 which connects into the conduit 27 is also relieved of pressure and, as the conduit 67 is in communication with the conduits 91 and 88 through the passages 68 and 69 of the valve 24 in application position, said conduits 91 and 88 will be relieved of pressure as long as the valve 24 remains in application position. However, as the valve 24 returns to its normal position approximately simultaneously with the return of the valve 1 to normal position, the connection of the conduits 91 and 88 with the conduit 67 is immediately broken. This action would not occur when the valve 39 is in normal position but influences the operation in the event of a premature application of the valve 39 and their full function will be described in that connection.

The second control to assume the normal position is the main control valve 24. The admission of pressure to the normal chamber of the valve 24 through the conduit 28 actuates the movable member 25 of said valve to the position shown in Fig. 4, which is the normal position. It should be noted that during this operation, in the event the valve 1 again assumes the application position, the valve 24 will immediately return to the application position. Immediately upon the valve 24 assuming the normal position the conduit 88 leading to the indicator 43 is connected with the exhaust conduit 90 through the passage 89. The pressure beneath the spring-operated piston 45 is thereby exhausted, permitting the spring above the piston 45 to return the indicator to clear position (Fig. 11). This acts as an indicator for the operator that the track condition is clear and is the visible means for informing the operator that the valve 24 has returned to its normal position and also that the control system is in a condition in which it may be returned manually to normal position through the manipulation of the valve 39. The conduit 61 constantly supplied with main reservoir pressure is upon this operation placed in communication with the conduit 86 leading to the valve 39 where it is closed by the movable member 41 of said valve in normal position. By supplying the conduit 86 with pressure an advance setting of the device is accomplished preparatory to its return to normal position upon the operation of the valve 39.

The pressure delivered to the conduit 82 which connects with the conduit 37 leading to the application chamber of the valve 34 is trapped in said conduits by reason of the closure of the conduit 82. Likewise, the pressure delivered to the conduit 73 which connects with the conduit 32 leading to the application chamber of the valve 29 is trapped in said conduits by reason of the closure of said conduit 73. This causes an advance setting of the device preparatory to its return to normal position when the valve 39 is operated.

The conduit 66 which is closed at its outlet end by the movable member 41 of the valve 39 in normal position is in communication with the conduit 67 through the passages 68 and 69 and, as the conduit 67 is connected with the multiple exhaust conduit 65 through the valve 1 as hereinbefore described, the conduit 66 will be open to exhaust. This adjustment likewise causes an advance setting of the device preparatory to its return to normal upon the operation of the valve 39.

The pressure delivered to the conduit 91 by the conduit 67 when the valve 24 is in application position will remain trapped therein due to the closure of the conduit 91 at the valve 24 in normal position. The conduit 91 is also closed by the movable member 30 of the valve 29 in application position. This pressure, however, will exhaust upon the return of the valves 29 and 34 to normal position.

After the normal sequence of changes in the condition of the control system due to the restoration of the main electrical control valve 1 and the main control valve 24 to their normal position has occurred, as above described, the control system is in a condition whereby it can be returned to normal by the manipulation of the restoring valve 39 to application position. This manipulation of the valve 39 is necessary before a complete restoration of the control system to normal is effected and as it must follow the return to normal of the valves 1 and 24 it acts as a safety device requiring the manipulation of said valve to accomplish return of the remaining control elements of the control system and thereby prevents any automatic return to normal without the operator intervening.

Upon the application of the restoring valve by the operator the movement of the valves 34 and 29 to normal position is substantially simultaneous therewith. However, the system is so designed that the valve 34 will return to normal position somewhat in advance of the valve 29, as will be hereinafter explained. The pressure in the application chamber of the valve 34 exhausts through the conduit 37, the passage 77 of the valve 29 in application position, the conduit 87, the restricted passage 79 of the valve 39, the conduit 80 and thence to the multiple exhaust conduit 81. As the conduit 82 leading from the valve 24 is connected with the conduit 37 the pressure trapped therein upon the valve 24 assuming normal position will also exhaust.

The restricted exhaust from the application chamber of the valve 34 provides for again admitting pressure to said valve to move it to application position in the event that the valves 1 and 24 return to application position during the time that the valve 39 is also in application position. The pressure in the application chamber of the valve 29 exhausts through the conduit 32 connected into the conduit 73 and through the passage 364 of the valve 39, the conduit 66, the passages 68 and 69 of the valve 24, the conduit 67 and thence through the conduit 27 and the valve 1 to the multiple exhaust conduit 65. As the conduit 73 leads from the valve 24 the pressure trapped therein upon the valve 24 assuming normal position will also exhaust. As the exhaust of pressure from the application chamber of the valve 29 depends upon the conduits 66 and 67 being in registration it is evident that, in the event the valves 1 and 24 should return to application position during the time that the valve 39 is in application position, pressure will again be supplied to the application chamber of the valve 29 to move it to application position.

Simultaneously, upon the release of pressure from the application chambers of the valves 34 and 29, the pressure that operates in the normal chamber of the valve 24 to force it to normal position will exhaust through the conduit 28, the passages 70, 71 and 363 of the valve 29 in application position, thence through the conduit 64 connected with the conduit 76, through the passage 63 of the valve 39 in application position. The conduit 76 in turn connects with the manifold exhaust conduit 65.

These connections provide a safety feature which insures that after the pressure that operates to force the valve 24 to normal position has performed its function it will exhaust, thus preventing pressure being trapped that would otherwise nullify pressure supplied to the application chamber of the valve 24 to force it to application position in the event the valve 1 returns to the application position when the valve 39 is in application position.

It will be remembered that upon the return of the valve 24 to normal position the conduit 86 is supplied with main reservoir pressure which is shut off by the valve 39 in normal position. However, upon the application of the valve 39 the conduit 86 is brought into registration with the conduits 38 and 33 through the passage 74 in the movable member 41 of the valve 39. It will be noted that the passage 74 is provided with two main outlet ends and a restricted branch opening intermediate of said outlets (Figs. 6 and 7).

When main reservoir pressure is supplied to the conduit 38 leading to the normal chamber of the valve 34 through the connections described the movable member 35 of the valve 34 is actuated to the position shown in Fig. 2 of the drawings, that is to say, the normal position. At the same time the main reservoir pressure from the conduit 86 passes through the restricted branch opening of the passage 74 to the conduit 33, thus supplying the normal chamber of the valve 29 with pressure simultaneously with the supply of pressure to the normal chamber of the valve 34.

However, it will be remembered that the valve 34 returns to normal position slightly in advance of the valve 29. The reason for this is that the restricted branch opening of the passage 74 supplies the normal chamber of the valve 29 with pressure gradually, whereas the normal chamber of the valve 34 is supplied at once with the full pressure through the unrestricted opening of the passage 74. The valve 29 is also slightly retarded in its movement to normal position by back pressure of the air exhausting from the application chamber of said valve through the connections previously described.

It will be noted that during this operation, in the event the valves 1 and 24 again assume the application position, the pressure supplied by the conduit 86 will exhaust to atmosphere through the valve 24 in the application position and the normal chambers of the valves 34 and 29 will likewise be open to exhaust through the connections described when the valve 39 is in application position. Simultaneously with this exhaust the application chambers of both of the valves 34 and 29 will again be supplied with pressure through the valve 24 in application position, as hereinbefore described. It will therefore be understood that, regardless of the position of the valve 39, if the main electrical control valve is operated to application position, the remaining valves will assume application position. Therefore, whenever the track conditions are such that the main electrical control valve operates to application position, the brakes will be applied.

The third control to assume the normal position is the valve 34. Immediately upon the valve 34 assuming normal position the conduit 96 leading to the whistle 54 is no longer supplied with main reservoir pressure from the conduit 56, as the passage 329 in the movable member 35 no longer places the two in connection. The conduit 95 connected with the conduit 96 assumes communication with the conduit 93 leading to the valve 29 through the passage 94 in the movable member 35 of the valve 34 and, since the conduit 93 is in turn connected with the conduit 64 through the passages 71 and 363 in the valve 29, said conduit 64 exhausting through the valve 39, the pressure remaining in the conduit 96 will release through these connections and the whistle 54 will no longer sound. This serves to inform the operator that the valve 34 is returned to normal position.

The fourth control to assume the normal position is the exhaust control valve 29. Immediately upon the valve 29 assuming normal position any pressure remaining in the normal chamber of the valve 24 and the conduit 28 will be exhausted through the passages 71 and 70 in the movable member 30 of the valve 29, and thence through the conduit 72 connected with the multiple exhaust conduit 65.

An additional safety feature is thus provided which insures that, even though the valve 29 returns to normal position before the pressure that operated to force the valve 24 to normal position has fully exhausted through the conduit 64 and the connections above described when the valves 29 and 39 are in application position, any pressure which would otherwise remain trapped in the normal chamber of the valve 24 will immediately exhaust. Thus, in the event that pressure is again supplied to the application chamber of the valve 24 due to the valve 1 returning to application position it will not prevent a re-application of the valves 24, 29 and 34, causing another application of the brakes.

It will be remembered that upon the return of the valve 24 to normal position the conduit 91 has pressure trapped therein due to the closure of said conduit by the movable member 30 of the valve 29. However, as the conduit 91 now connects with the conduit 93 leading to the whistle 54 through the valve 34, the conduits 91 and 93 being placed in communication through the passage 92 of the valve 29 in normal position, the trapped pressure in the conduit 91 will expand back into the whistle causing a short alarm to be sounded which will indicate to the operator that the valve 29 has returned to normal position and that the restoring valve 39 should be allowed to return to normal position.

The conduit 37 leading from the application chamber of the valve 34 is placed in communication with the conduit 78 through the passage 77 of the valve 29 in normal position. The conduit 37 is, therefore, no longer connected with the conduit 87, and therefore the application chamber of the valve 34 is no longer connected with exhaust.

As the conduit 78 is closed by the movable member 41 of the valve 39 in application position the application chamber of the valve 34 will no longer be connected with atmosphere upon the return of the valve 29 to normal position as long as the valve 39 remains applied.

The return of the valve 29 to normal position is coordinated with the exhaust of pressure from the application chamber of the valve 34 so that the application chamber of said valve will be completely exhausted and said valve will have completely returned to normal position before the valve 29 returns to normal position. However, there is a safety factor in that, should the valve 29 return to normal position before the valve 34 for any reason, the conduit 78 will relieve the pressure in the application chamber of the valve 34 if the operator permits the valve 39 to return to normal position, since the conduit 78 is in communication with the conduit 80 leading to the multiple exhaust conduit 81 through the passage 79.

Following this exhaust of pressure a re-application of the valve 39 will again supply the normal chamber of the valve 34 with pressure from the conduit 86 as hereinbefore described, thus returning the valve 34 to normal position regardless of the premature return of the valve 29 to normal position. This is an important provision for the reason that so long as the valve 34 remains applied it is impossible to release the locomotive and train brakes even though the main electrical control valve 1 may have returned to normal position.

Following the return of the valves 34 and 29 to normal position by the manual application of the restoring valve 39 it is only necessary to release the valve 39 and it will automatically return to normal position. Upon releasing pressure on the plunger 40 the spring 42 forces the valve to normal position. Upon the return of the valve 39 to normal position the control system is again normal, but there are certain changes in the condition of the system that it is now important to observe. These conditions are in the nature of an advance setting of the device preparatory to its re-application following the return of the main electrical control valve 1 to application position upon the track conditions again becoming unsafe. These conditions will now be described.

The normal chamber of the valve 34 through the conduit 38 and the normal chamber of the valve 29 through the conduit 33 are both connected with the conduit 75 which is open to exhaust through the conduit 76 and the multiple exhaust conduit 65 as the passage 74 in the movable member 41 of the valve 39 places said conduits 38 and 33 in registration with the conduit 75. Therefore, the pressure in the normal chambers of the valves 34 and 29 will exhaust, relieving the pressure in said chambers so that there will be no pressure in opposition to the pressure admitted to the application chambers of said valves to move them to application position upon the valve 1 being re-applied. Main reservoir pressure supplied to the conduit 62 when the valve 1 is in normal position will again enter the conduit 64 by reason of the passage 63 in the valve 39 again connecting the two. As the valve 29 has returned to normal position it will be closed by the movable member 30 of the valve 29. This provides another safety factor in that, should the valve 29 for any reason fail to return to normal position following the return of the valve 34 to normal position, the conduit 64 will supply the conduit 93 with pressure through the passages 363 and 71 of the valve 29 in application position, said conduit 93 connecting with the conduit 95 through the passage 94 of the valve 34 in normal position, thus delivering pressure to the whistle 54 through the conduit 96 into which the conduit 95 connects. An audible signal will thus be sounded which informs the operator that the device is not completely returned to normal and therefore, by again manipulating the valve 39 to application position the valve 29 can be returned to normal position in the manner hereinbefore described.

It has already been disclosed how a premature application of the valve 39 will not prevent the control system from assuming application position when actuated to that position by the valve 1, and it was explained that if the valve 39 was permitted to remain in the application position, the valves 24, 29 and 34 would likewise remain in application position no matter what the position of the valve 1. As the return of the control system to normal position is dependent upon the valve 39 being in normal position when the valve 1 returns to normal position, the effect of a premature application of the valve 39 on the control system will be described. The valve 39 can be in application position through a conscious operation on the part of the operator, or through a failure of the spring 42 to return it to normal position.

When the track condition is cleared the main electrical control valve 1 is restored to normal position, as shown in Fig. 14. The application chamber of the valve 24 is thus connected with the atmosphere so that the pressure admitted to the normal chamber of said valve 24 through the conduit 62, the passage 63 of the valve 39 in normal position (Fig. 6), the conduit 64, the passages 363, 71 and 70 of the valve 29 in application position (Fig. 9) and thence through the conduit 28, will not be opposed in forcing the valve 24 to normal position. However, should the restoring valve 39 be in application position (Fig. 7) when the return of the control system to normal is initiated by the valve 1 again assuming normal position, it will be noted that communication between the conduits 62 and 64 is broken by the non-registration of the passage 63. Therefore, the pressure in the conduit 62 from the valve 1 will be closed off by the movable member 41 of the valve 39 (Fig. 7) and thus be prevented from returning the valve 24 to normal position until the valve 39 is restored to normal position (Fig. 6). As the valve 24 supplies the pressure to the conduit 86 that operates to return the valves 34 and 29 to normal position when said valve 24 is in normal position (Fig. 4) it is evident that so long as the valve 24 is prevented from returning to normal position the power to restore the device to normal position will be unavailable until the operator permits the valve 39 to return to normal position.

After such return to normal position and the return of the valve 24 to normal position it is of course proper and necessary to again manipulate the valve 39 to application position to effect the restoration of the valves 34 and 29 to normal position. Herein is another safety provision in that it is impossible to have the valve 39 in such position that the control system will automatically restore itself to normal position without a conscious operation on the part of the operator at the time and in the manner hereinbefore described.

As an indication to the operator that the system is in a condition whereby it may be returned to normal through the proper manipulation of the valve 39 it will be noted that the conduit 88, which connects with the indicator 43 is connected with atmosphere by reason of the passages 69 and 68 of the valve 24 in application position (Fig. 5) connecting said conduit 88 with the conduit 67, said conduit 67 being connected with the conduit 27, which is open to exhaust through the valve 1 in normal position. The indicator is thus caused to indicate the clear position and the operator is thus informed that he may return the system to normal by conforming to certain preconceived operations.

The progressive effect upon the control elements of the braking system due to the control system returning to normal position will now be described. It will be assumed that the automatic brake valve 97 and the independent brake valve 168 are in normal or running position. The valves 1 and 29 do not effect the brake operation directly, whereas the valves 24, 34 and 39 are directly connected with the brake operation. Therefore, it is only necessary in describing this feature of the construction to return to the valves 24, 34 and 39.

Upon the return of the main control valve 24 to normal position the conduit 319 is closed by the movable member 25 of the valve 24. The conduit 212 of the application cylinder supply connections is also closed by the movable member 25 of the valve 24. Therefore, the application cylinder supply connections will no longer be supplied with reducing valve pressure for the application of the locomotive brakes and the pressure in the conduit 212 will be trapped or released according to the position of the governors 184 and 214 and the control valve 257.

The distributing valve release connections again connect through the valve 24 in normal position with the conduit 183 which is a part of the distributing valve release connections, said conduit being in communication with the conduit 342 through the passage 343 in the movable member 25 of the valve 24. This operation will not, however, effect a release of the distributing valve or the locomotive brakes for the reason that the distributing valve release connections are still closed so long as the valve 34 remains in application position, since the conduits 342 and 138 are out of registration due to the fact that the passage 344 in the movable member 35 of the valve 34 does not connect the two. As the distributing valve release connections are inoperative in any event until the equalizing portion of the distributing valve has operated to release position the ultimate release of the locomotive brakes through these connections will be described hereinafter in connection with the description of the return of the distributing valve to running position.

However, a safety factor is provided that assures that in the event the equalizing slide valve of the distributing valve leaks a release of the locomotive brakes will not be automatically accomplished upon the valve 24 again assuming normal position.

The independent unrestricted release connections again connect through the valve 24 in normal position with the conduit 178 which is in communication with the conduit 345 through the passage 346 in the movable member 25 of the valve 24. However, as the conduit 347 of the independent unrestricted release connections is connected with the conduit 247 of the independent restricted release connections through the passage 349 of the valve 34 in application position it is evident that even though the valve 168 should be manipulated to release position the release of the distributing valve will still be restricted to the pressure setting of the restricted exhaust safety valve 243, or approximately 43 pounds. This condition obtains as long as the valve 34 remains in application position. A safety adjustment is thus provided that assures that even though the valve 168 may be held in release position a complete release of the locomotive brakes will not be automatically accomplished upon the valve 24 again assuming normal position.

The independent restricted release connections are closed by the movable member 25 of the valve 24 in normal position and are, therefore, inoperative with the exception of the conduit 247 which connects the valve 34 with the restricted exhaust safety valve 243 so long as the valve 34 is in application position, as above described.

The only restrictions that are imposed upon the braking system when the restoring valve is in application position is that the independent unrestricted release connections are broken by reason of the conduit 345 being out of communication with the conduit 347 since the passage 348 no longer connects the two. As the independent unrestricted release connections are restricted as long the valve 34 remains applied, it is evident that, should the valve 34 for any reason fail to return to normal position following the application of the valve 39 and its return to normal position when the control system should be restored to normal position, the release operation of the independent brake valve 168 will still be restricted.

The independent restricted release connections, while not imposing any restrictions upon the braking system further than through their connection with the independent unrestricted release connections through the valve 34 in application position, as hereinbefore described, are likewise broken, by reason of the conduit 350 being out of communication with the conduit 352 as the passage 351 no longer connects the two when the valve 39 is in application position.

While these connections are inoperative when the valve 24 is in normal position they provide a safety adjustment in that, if the valve 24 again returns to application position due to the action of the valve 1 again returning to application position, a restricted release of the locomotive brakes could not be accomplished by manipulation of the valve 168 to release position so long as the valve 39 is in application position.

It is therefore necessary for the operator to permit the valve 39 to return to normal position before the independent restricted release connections will be available to effect a partial release of the locomotive brakes. The same conditions are applicable to the independent unrestricted release connections when the valve 34 returns to normal position and so long as the valve 39 remains in applied position.

Upon the return of the valve 34 to normal position the restrictions that are imposed upon the automatic brake valve 97 in its release operations when the control system is in application position are removed and the braking system is placed under the unlimited control of the operator insofar as the valve 97 is concerned.

Upon the return of the valve 34 to normal position following an application of the locomotive and train brakes, and assuming the valve 97 to be in normal or running position, main reservoir pressure is again supplied to the chamber 116 of the valve 97 and is available for quickly releasing both the locomotive and train brakes and at the same time to recharge the train brake system and the pressure chamber of the distributing valve preparatory to effecting subsequent brake applications. This would necessitate a manipulation of the valve 97 to release and recharging position.

The control of the pump is again placed under the influence of the low pressure head 333 of the pump governor 316 and as soon as the high pressure in the main reservoir and in the high pressure head 328 has reduced to the setting of the low pressure head 333 due to the use of the pressure in recharging the system, the low pressure head 333 will constitute the only control for the valve 334.

Feed valve pressure will again be supplied to the chambers 103 and 104 above and below the equalizing piston 99 and the reduced pressure of 50 pounds, which remains in the chambers, will be raised to the setting of the feed valve 312, or 70 pounds. The equalizing reservoir 129, the equalizing reservoir governor 184 and the brake pipes 338, 339 and 290 will likewise be supplied with a feed valve pressure of 70 pounds, thus bringing about a stabilization of the braking system and effecting a complete release of the locomotive and train brakes and also place it in a condition whereby another brake application may be brought about.

The recharging of the brake pipe 290 has the effect of returning the distributing valve 270 to its normal or running position, as shown in Fig. 23. This results in a release of the locomotive brakes and at the same time places the distributing valve in a condition for another application of the locomotive brakes. When the pressure in the brake pipe 290 builds up above the reduced pressure on the opposite side of the equalizing piston 287 the piston is forced to the position shown in Fig. 23. The constantly increasing pressure delivered from the brake pipe 290 to the equalizing piston chamber 286 passes through the feed groove 291 and enters the equalizing slide valve chamber 292 where it expands through the passage 293 into the pressure chamber 294, thus recharging the pressure chamber 294 to 70 pounds pressure which is equal to the pressure charge in the brake pipe 290 so long as the system is in running position. The equalizing portion of the distributing valve is then in a condition for another application of the locomotive brakes.

Simultaneously with the recharging of the pressure chamber due to the movement of the equalizing piston 287 the equalizing slide valve 289 moves to the position shown in Fig. 23. It will be remembered that in the description of the application of the locomotive brakes it was explained that they were set at approximately 50 pounds by reason of the pressure developed in the application cylinder 271 which causes the application portion of the distributing valve to supply the brake cylinders of the locomotive and tender with pressure equal to the pressure delivered to the application cylinder from the pressure chamber when the equalizing slide valve 289 is in application position. The pressure thus developed is trapped in the application cylinder 271 in the application chamber 307 and in the application cylinder connections so long as the equalizing slide valve 289 remains in application position. Upon the return of the valve 289 to normal or running position this pressure will release if the valves 168 and 97 remain in normal or running position. As the valve 289 in normal or running position connects the application cylinder 271, the application cylinder connections and the application chamber 307 with the distributing valve release connections and as the distributing valve release connections are now open to atmosphere through the valve 34 in normal position the conduits 342 and 138 being in communication through the passage 344 in the movable member 35 of the valve 34, it is evident that the pressure trapped in the application cylinder 271 will exhaust because of the building up of the pressure in the brake pipe 290 when the valves 168 and 97 remain in normal or running position. The release of the locomotive brakes depends upon this exhaust of pressure from the application cylinder 271 and this operation will now be explained.

When the pressure in the application cylinder 271 begins to reduce, the greater pressure in the chamber 274 to the right of the application piston 272 with the assistance of the graduating spring 273 forces the piston 272 to the left or toward the constantly lowering pressure. The movement of the piston 272 closes the application valve 278, thus cutting off the supply of pressure to the brake cylinder and at the same time actuates the exhaust valve 275 to release position. Immediately upon the exhaust valve 275 assuming the release position, as shown in Fig. 23, the pressure in the chamber 274 and in the passage 283 is open to exhaust through the passage 285 leading to atmosphere and, since the conduit 284 leading to the brake cylinders of the locomotive and tender is connected with the passage 283, there is a consequent exhaust of pressure from the brake cylinders which will ultimately entirely release the brakes of the locomotive and tender.

The conduit 347 of the independent unrestricted release connections is no longer connected with the conduit 247 of the independent restricted release connections when the valve 34 returns to normal position, as the passage 349 no longer affords communication between the two. However the conduit 347 is now brought into registration with the multiple exhaust conduit 81 through said passage 349 when the valve 34 is in normal position, but the independent unrestricted release connections are inoperative so long as the restoring valve 39 remains in application position, as the conduits 345 and 347 are not in communication with one another.

The effect upon the locomotive brake governor 214 and the locomotive brake governor control valve 257 following the return of the distributing valve to running position is as follows:

When the pressure in the application cylinder connections has reduced to 42 pounds the control valve will again assume the normal or open position, as shown in Fig. 17, and the conduit 231 will be open to atmosphere through the restricted passage 263 in the valve 259. As pressure in the application cylinder connections is constantly reduced, when the reduction has equalled 40 pounds, the locomotive brake governor 214 will again assume the normal or closed position, as shown in Fig. 15. The pin valve 219 will seat, thus breaking communication between the chambers 218 and 229. The pressure remaining in the chamber 218 will continue to reduce through the distributing valve release connections until completely exhausted. Since pressure is then no longer supplied to the chamber 229 the control valve 257 will likewise completely exhaust said chamber 229. The valve plug 235 will again be raised from its seat due to the spring 233, and the governor 214 will be restored to its normal position. The raising of the valve plug 235 again places the application cylinder supply connections in communication with the application cylinder connections. The pressure of 45 pounds supplied to these connections by the reducing valve and which would be trapped in these connections by the return of the valve 24 to normal position will thus exhaust to atmosphere through the application cylinder connections and the distributing valve release connections.

However, as the equalizing reservoir governor 184 has returned to the normal or open position following the return of the valve 34 to normal position the governor 184 assumes the position shown in Fig. 13 from which it will be noted that the conduit 212 from the valve 24 and which connects into the passage 211 will be out of communication with the chamber 207 due to the port 210 being closed by the valve plug 205. Therefore, as the conduit 212 is closed by the valve 24 in normal position, it will be evident that the portion of the application cylinder supply connections between the valve 24 and the governor 184 will have pressure trapped therein, whereas the portion from the chamber 207 of the governor 184 to the passage 241 of the governor 214 will exhaust. In the event the operator prevents the recharging of the governor 184 through manipulation of the automatic brake valve 97 to any position that would prevent the release of the train brakes following the return of the valve 34 to normal position and the return of the valve 39 to normal position, and then manipulate the valve 168 to release position, pressure in the conduit 212 will be exhausted, as said conduit 212 will be in communication with the chamber 207, as the valve plug 205 opens the port 210 when the governor 184 is in the position shown in Fig. 18.

With the return of the valves 24 and 34 to normal position the only restrictions that are imposed upon the braking system are those that affect the independent brake valve 168 in its release position. These restrictions are removed upon the return of the restoring valve 39 to normal position. This is accomplished by the operator releasing the pressure upon the plunger 40 following the restoration of the valve 34 to normal position.

As the conduit 345 of the independent unrestricted release connections is now placed in communication with the conduit 347 through the passage 348, the independent unrestricted release connections are again operative and the operator again has control of the locomotive brakes by the valve 168 to an unlimited extent so far as said valve acts as a control for the distributing valve 270 which governs the application and release of the locomotive brakes. In the event that the valve 39 fails to return to normal position for any reason the restrictions on the release operation of the valve 168 will not be removed and the operator's attention will be directed to such failure when said valve 168 under these conditions fails to release the locomotive brakes.

From the foregoing description it will be understood that the operation of the system may be briefly described as follows:

The system as a whole is under the control of the track conditions. When the track is in a safe condition the system may be manually operated under the control of the operator in a normal manner whereby the brakes may be applied and released as desired in the operation of the train. When the condition of the track is unsafe the brakes are automatically applied and during and throughout an unsafe condition of the track only a restricted control of the locomotive brakes is permitted so that the train cannot be moved under a danger condition. After the system has operated incident to an unsafe condition of the track the brakes cannot be normally released by the operator until the operator has positively moved manually the control which is a prerequisite to the restoration of the system to a condition in which it may again be controlled by the operator to release and apply the brakes in a normal manner. The system also incidentally includes the safety features specifically described above and also indicators for informing the operator as to the condition of the system.

We are aware that the construction may be modified in numerous particulars without departure from the spirit and scope of the invention. We do not restrict ourselves unessentially, but what we claim and desire to secure by Letters Patent is:

1. In a train control system including a locomotive and train brake, the combination of a device operated to a safe and unsafe setting by the track conditions, with an air system including automatic means adapted to apply the train and locomotive brakes upon the setting of said device to unsafe position, means for manually effecting the partial release of said locomotive brake, and manual means operable following a safe setting of said device for optionally releasing both the train and locomotive brakes.

2. In a train control system, the combination of a device operated to a safe and unsafe setting by the track conditions, with an air system including automatic means adapted to apply the train and locomotive brakes upon the setting of said device to unsafe position, means for manually effecting the partial release of said locomotive brakes, manual means operable following a safe setting of said device for optionally releasing both the train and locomotive brakes, and indicating means to indicate the condition of the system.

3. In a train control system operating to apply and release locomotive and train brakes by pressure, a source of pressure for the system, means for maintaining the pressure supply, a high and low pressure governor for maintaining differential pressure in said supply, and an automatic device under control of track conditions for applying and releasing pressure to control the brakes, said automatic device also controlling the system to transfer the control thereof from the low pressure governor to the high pressure governor when the automatic device assumes application position.

4. In a train control system including locomotive and train brakes, the combination of a device operated to a safe and unsafe setting by track conditions, an air operated system adapted to apply the locomotive and train brakes concurrently or independently, an automatic device under control of said first named device to cause the application of said locomotive brakes irrespective of the operation of the train brakes, and means permitting restricted release of the locomotive brakes when the track conditions are unsafe.

5. In a train control system including locomotive and train brakes, the combination of a device operated to a safe and unsafe setting by track conditions, an air operated system adapted to apply the locomotive and train brakes concurrently or independently, an automatic device under control of said first named device to cause the application of said locomotive brakes irrespective of the operation of the train brakes, and a device adjustable to prevent or permit restricted release of the locomotive brakes when the track conditions are unsafe.

6. In a train control system, the combination of a device operated to a safe and unsafe setting by the track conditions, with an air system including means operating to reduce pressure to apply the train and locomotive brakes, pressure supplying means operated upon said reduction of pressure to supply pressure to apply the locomotive brakes, separate pressure supplying means for supplying pressure to cause and maintain an independent automatic locomotive brake application beyond the application established by said first pressure supplying means, and means for delaying said increased independent automatic locomotive brake application by said second named pressure supplying means.

7. In a train control system including an equalizing reservoir, the combination of a device operated to a safe and unsafe setting by the track conditions, with an air operated system including a manually controlled valve for reducing pressure to apply the brakes, automatic means operable to reduce pressure in said equalizing reservoir to apply the brakes upon an unsafe track condition, means for rendering said automatic means inoperative for reducing pressure in said equalizing reservoir when the manually controlled valve is operating, and means causing said automatic means to reduce pressure in said equalizing reservoir to a predetermined degree beyond the reduction in pressure established by said manually controlled valve when the operation of said manually controlled valve is discontinued.

8. In a train control system including an equalizing reservoir, the combination of a device operated to a safe and unsafe setting by track conditions, with an air operated system to automatically apply train and locomotive brakes by a predetermined reduction of pressure in said equalizing reservoir when the track condition is unsafe, means for setting the device to determine the amount of automatic reduction of pressure in said equalizing reservoir, and automatic means for supplying pressure to cause a further application of the locomotive brakes subsequent to the reduction of pressure by said first automatic means.

9. In a train control system including locomotive and train brakes, the combination of a device operated to a safe and unsafe setting by track conditions, an air operated system operating first to apply the locomotive and the train brakes concurrently and thereafter to apply the locomotive brakes in addition to said first application of the locomotive brakes, and an automatic device under control of said first named device to cause the application of said locomotive brakes irrespective of the operation of the train brakes.

10. In a train control system including locomotive and train brakes, the combination of a device operated to a safe and unsafe setting by track conditions, an air operated system adapted first to apply the locomotive and train brakes concurrently and thereafter to apply the locomotive brakes by an operation in addition to the first concurrent application of the locomotive and train brakes, an automatic device under control of said first named device to cause the operation of the locomotive brakes irrespective of the operation of the train brakes, and means permitting restricted release of the locomotive brakes when the track conditions are unsafe.

11. In a train control system including locomotive and train brakes, the combination of a device operated to a safe and unsafe setting by track conditions, an air operated system adapted first to apply the locomotive and train brakes concurrently and thereafter to apply the locomotive brakes by an operation in addition to the first concurrent application of the locomotive and train brakes, an automatic device under control of said first named device to cause the operation of the locomotive brakes irrespective of the operation of the train brakes, and a device adjustable to prevent or permit restricted release of the locomotive brakes when the track conditions are unsafe, as desired.

12. In a device of the kind described including locomotive and train brakes, a device operable to safe or unsafe setting by track conditions, an air operated system to apply the locomotive train brakes concurrently or independently to set the brakes and independent of the speed of the train, and an automatic device under control of said first named device to cause application of the locomotive brakes irrespective of the operation of the train brakes.

13. In an automatic device for stopping trains including locomotive and train brakes, a device operable to safe or unsafe setting by track conditions, an air operated system to apply both sets of brakes to stopping position, an automatic device under control of said first named device to apply the train brakes and insure their application prior to application of the locomotive brakes, and emergency means insuring application of the locomotive brakes regardless of the condition of the train brakes, and even when the train brakes are released.

WILLIAM A. HARDCASTLE.
JOE C. MINTER.